US008014620B2

(12) United States Patent
Kimura

(10) Patent No.: US 8,014,620 B2
(45) Date of Patent: Sep. 6, 2011

(54) IMAGE PROCESSING SYSTEM, IMAGE COMPRESSION SYSTEM, IMAGE EDITING SYSTEM, COMPUTER READABLE MEDIUM, COMPUTER DATA SIGNAL AND IMAGE PROCESSING APPARATUS

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 934 days.

(21) Appl. No.: 11/826,299

(22) Filed: Jul. 13, 2007

(65) Prior Publication Data
US 2008/0050028 A1    Feb. 28, 2008

(30) Foreign Application Priority Data
Aug. 24, 2006    (JP) .................................. 2006-227554

(51) Int. Cl.
*G06K 9/36* (2006.01)
*G06K 9/40* (2006.01)
*G06K 9/46* (2006.01)
(52) U.S. Cl. ..................... 382/238; 382/166; 382/261
(58) Field of Classification Search .............. 382/166, 382/232, 238, 260–265, 274, 275
See application file for complete search history.

(56) References Cited

U.S. PATENT DOCUMENTS

| 5,345,317 | A |   | 9/1994 | Katsuno et al. |
|---|---|---|---|---|
| 5,657,085 | A | * | 8/1997 | Katto ........................... 348/398.1 |
| 5,701,367 | A |   | 12/1997 | Koshi et al. |
| 5,818,970 | A |   | 10/1998 | Ishikawa et al. |
| 6,256,417 | B1 | * | 7/2001 | Takahashi et al. ............ 382/232 |
| 6,724,945 | B1 | * | 4/2004 | Yen et al. ........................ 382/274 |
| 2002/0037100 | A1 |   | 3/2002 | Toda et al. |
| 2003/0123740 | A1 | * | 7/2003 | Mukherjee .................... 382/239 |
| 2004/0165782 | A1 |   | 8/2004 | Misawa |
| 2004/0264793 | A1 |   | 12/2004 | Okubo |
| 2005/0157945 | A1 | * | 7/2005 | Namizuka et al. ............ 382/290 |
| 2006/0088222 | A1 | * | 4/2006 | Han et al. ...................... 382/232 |

FOREIGN PATENT DOCUMENTS

| JP | A-7-135569 | 5/1995 |
|---|---|---|
| JP | B2 2611012 | 2/1997 |
| JP | A-9-084003 | 3/1997 |
| JP | B2 2720926 | 11/1997 |
| JP | A 11-32206 | 2/1999 |
| JP | B2 2910000 | 4/1999 |

(Continued)

OTHER PUBLICATIONS

Japanese Office Action dated Jun. 7, 2011 for Japanese Application No. 2006-227554 (with translation).

*Primary Examiner* — Yubin Hung
(74) *Attorney, Agent, or Firm* — Oliff & Berridge, PLC

(57) ABSTRACT

An image processing system includes an identification unit, a region division unit and a pixel value change unit. The identification unit identifies a second pixel among an image including a first pixel and the second pixel. A pixel value of the first pixel is not to be changed. A pixel value of the second pixel is to be changed. The region division unit divides the image into regions. The pixel value change unit changes the value of the second pixel to a predetermined value through a filtering process when the second pixel identified by the identification unit is included within the regions obtained by the region division unit.

24 Claims, 26 Drawing Sheets

FOREIGN PATENT DOCUMENTS

| | | |
|---|---|---|
| JP | B2 3083336 | 6/2000 |
| JP | B2 3122481 | 10/2000 |
| JP | B2 3231800 | 9/2001 |
| JP | A 2002-77633 | 3/2002 |
| JP | A-2002-262114 | 9/2002 |
| JP | A 2002-369011 | 12/2002 |
| JP | A 2003-18412 | 1/2003 |
| JP | A 2003-18413 | 1/2003 |
| JP | A-2003-115031 | 4/2003 |
| JP | A-2003-169221 | 6/2003 |
| JP | A 2003-219187 | 7/2003 |
| JP | A 2003-244447 | 8/2003 |
| JP | A 2004-260327 | 9/2004 |
| JP | A 2005-20227 | 1/2005 |
| JP | A 2006-19957 | 1/2006 |
| JP | A-2006-093880 | 4/2006 |

* cited by examiner

FIG. 15
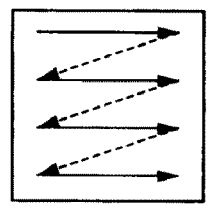 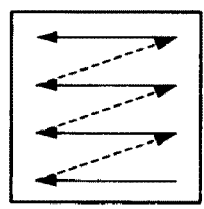 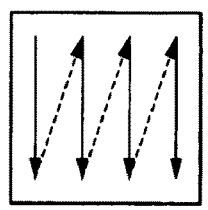 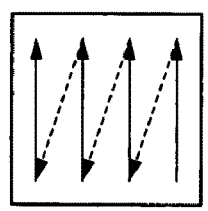
(A) DIRECTION 1   (B) DIRECTION 2   (C) DIRECTION 3   (D) DIRECTION 4
FIG. 16
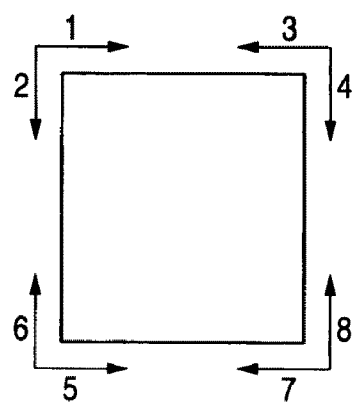

*FIG. 26B*
*FIG. 27*

*FIG. 28A*  END OF IMAGE p(x)  p(x+1)  p(x+2)  p(x+3)
 B      B       A       A

*FIG. 28B*  END OF IMAGE p(x+2) p(x+1) | p(x) p(x+1) p(x+2) p(x+3)
  A      B      B     B      A      A

*FIG. 29A*  END OF IMAGE p(x)  p(x+1)  p(x+2)  p(x+3)
 B      B       A       B

*FIG. 29B*  END OF IMAGE p(x+2) p(x+1) | p(x) p(x+1) p(x+2) p(x+3)
  A      B      B     B      A      B

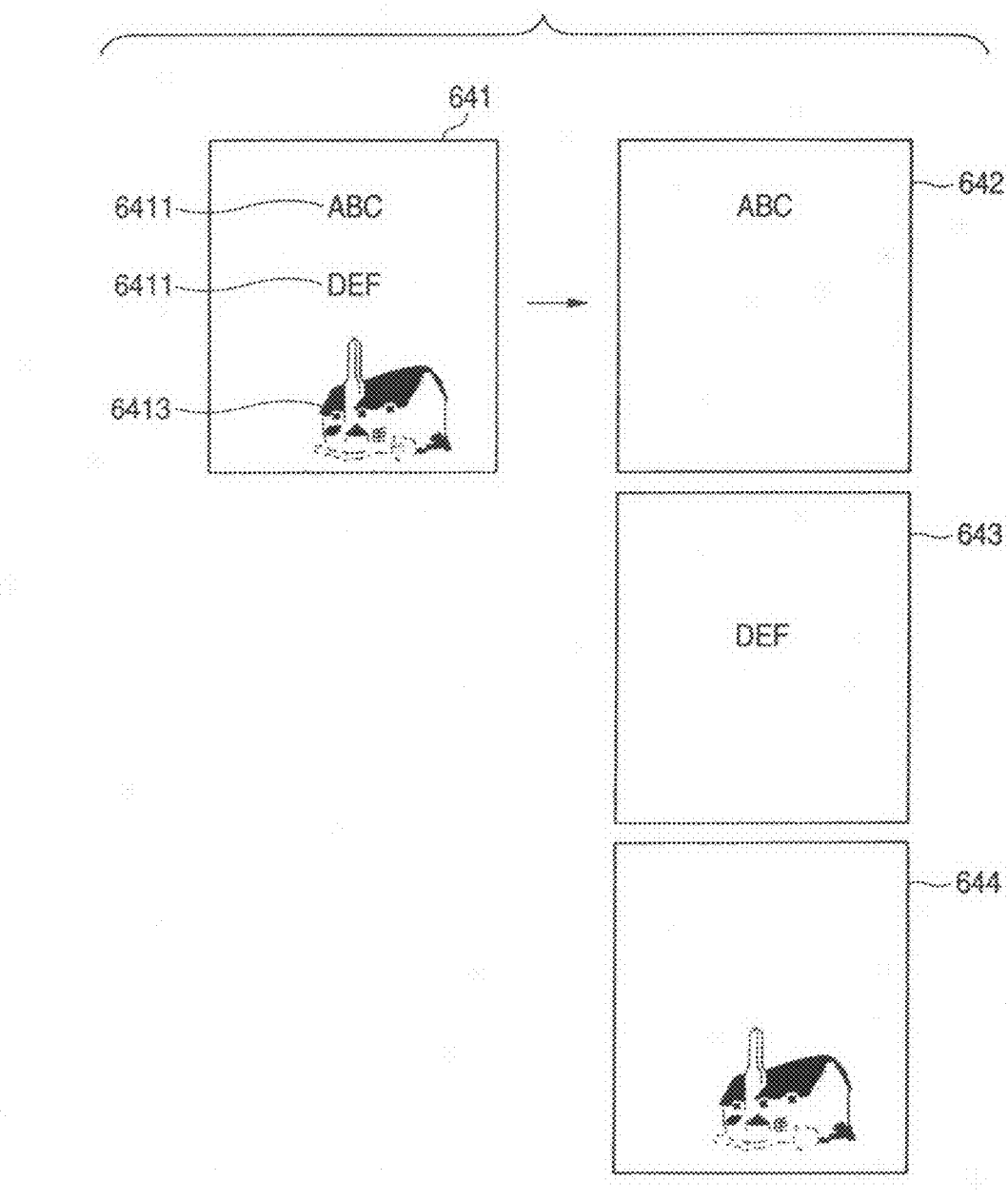

IMAGE PROCESSING SYSTEM, IMAGE COMPRESSION SYSTEM, IMAGE EDITING SYSTEM, COMPUTER READABLE MEDIUM, COMPUTER DATA SIGNAL AND IMAGE PROCESSING APPARATUS

CROSS-REFERENCE TO RELATED APPLICATIONS

This application is based on and claims priority under 35 U.S.C. §119 from Japanese Patent Application No. 2006-227554 filed Aug. 24, 2006.

BACKGROUND

1. Technical Field

The invention relates to an image processing system, an image compression system, an image editing system, a computer readable medium, a computer data signal, and an image processing apparatus.

2. Related Art

There is an image compression method, such as a mixed raster content (MRC) method specified in ITU-T recommendations T. 44.

This is a method for solving a problem that distortion of text or line drawing part increases when an image including the text or line drawing part is compressed by means of transform coding, such as JPEG.

In the MRC method, text or line drawing part is extracted from an input image. Moreover, color data of the extracted text or line drawing part is extracted. In addition, the text or line drawing part is removed from the input image. The text or line drawing part is coded as binary data by using a binary data compression method, such as MH, MMR, or JBIG. The color data is coded by using a multi-level image compression method, such as JPEG. In addition, a background image that remains after removing the text or line drawing part from the input image is coded by the multi-level image compression method, such as JPEG.

By performing the multi-plane compression described above, it becomes possible to keep the image quality of the text or line drawing part high even in the case of a high compression rate. FIG. 63 is a view cited from ITU-T recommendations T. 44. Foreground 631 indicates color data. Mask 632 indicates information of text and line drawing part, and Background 633 indicates a background image that remains after removing the text or light-emitting portion from an input image.

Alternatively, it is possible to set the text or line drawing part as binary data that is different for each color, without using the MRC format described above.

For example, a black text or line drawing part is extracted from an input image so as to create binary data. Further, a red-colored text or line drawing part is extracted from the input image so as to create binary data. Furthermore, multi-level image data in which the black or red-colored text or line drawing part is removed is created from the input image. Binary data created by extracting the black text or line drawing part is compressed in a binary data compression method. Moreover, information indicating black is additionally granted to a color of the image. In the same manner, binary data created by extracting the red-colored text or line drawing part is compressed in the binary data compression method. In addition, information indicating a red color is additionally granted to a color of the image. In addition, a background image that remains after removing the text or line drawing part from the input image is coded by the multi-level image compression method, such as JPEG.

As shown in FIG. 64, in the case when an input image 641 including a text ('ABC'; red-colored text 6411) that is drawn by a red color, a text ('DEF'; black text 6412) that is drawn by black, and a non-text line drawing part (image part where a house is drawn; house image 6413) exists, the input image 641 is divided into a binary image 642 obtained by extracting only 'ABC', a binary image 643 obtained by extracting only 'DEF', and a multilevel image 644 that is the rest parts and the binary image 642, the binary image 643, and the multilevel image 644 are independently coded. In addition, information, which indicates that a color of the binary image 642 obtained by extracting 'ABC' is a red color and a color of the binary image 643 obtained by extracting 'DEF' is black, is additionally granted.

In the case when the background image is created as described above, high-frequency components are generated if the text or line drawing part is simply removed. As a result, the created image becomes not suitable for the transform coding, such as JPEG. By compensating for the extracted text or line drawing part, the compression efficiency may be improved. A compensated pixel value is arbitrary because the compensated pixel value is overwritten in the text and line drawing part at the time of decoding. Accordingly, various kinds of compensation methods have been proposed.

SUMMARY

According to an aspect of the invention, an image processing system includes an identification unit, a region division unit and a pixel value change unit. The identification unit identifies a second pixel among an image including a first pixel and the second pixel. A pixel value of the first pixel is not to be changed. A pixel value of the second pixel is to be changed. The region division unit divides the image into regions. The pixel value change unit changes the value of the second pixel to a predetermined value through a filtering process when the second pixel identified by the identification unit is included within the regions obtained by the region division unit.

BRIEF DESCRIPTION OF THE DRAWINGS

Exemplary embodiments of the invention will be described in detail below with reference to the accompanying drawings, wherein:

FIG. 15 is explanatory views illustrating examples of a direction of raster scan;

FIG. 16 is an explanatory view illustrating an example of the direction of raster scan;

FIG. 27 is an explanatory view illustrating an example of the pixel arrangement;

FIG. 28 is explanatory views illustrating examples of the pixel arrangement;

FIG. 29 is explanatory views illustrating examples of the pixel arrangement;

FIG. 64 is an explanatory view illustrating a related art.

DETAILED DESCRIPTION

First, a basic method will be described to facilitate understanding of exemplary embodiments.

In this exemplary embodiment, compensation of a background image excluding text and line drawing part is efficiently performed in accordance with a subsequent-stage compression method.

This exemplary embodiment compensates sequentially without causing a pixel value gap at the time of compensation. Moreover, this exemplary embodiment relates to compensation for an extracted part of text or line drawing part, for example, in a method of performing image coding by extracting the text or line drawing part from an input image and then separating the extracted text or line drawing part into a binary image coding plane and a multilevel image coding plane.

Hereinafter, the exemplary embodiments of the invention will be described with reference to the accompanying drawings.

1. Configuration View of Modules

Figure 1:
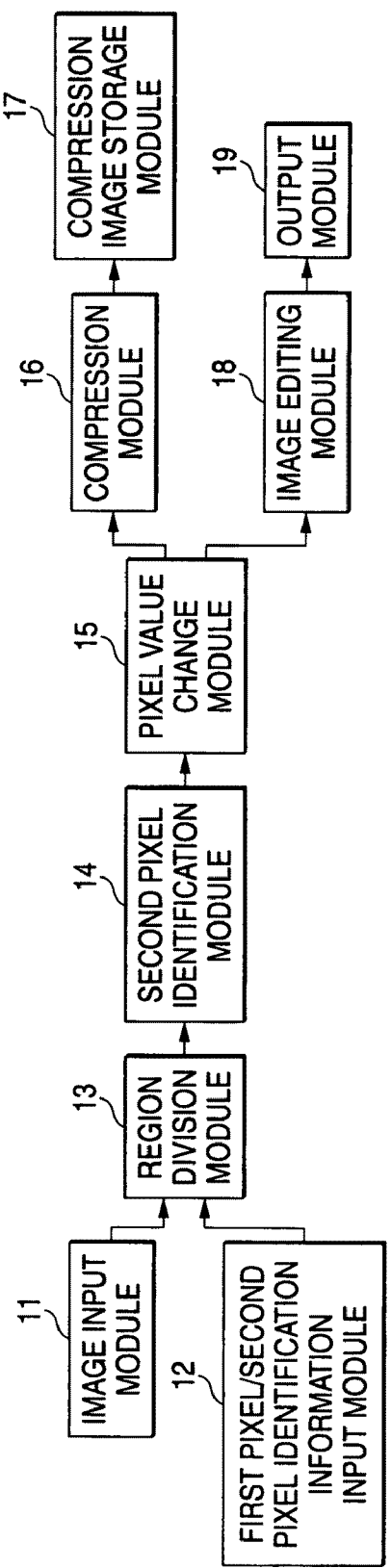
FIG. 1 is a conceptual module configuration view illustrating an example of the configuration according to an exemplary embodiment.

FIG. 1 is a conceptual view illustrating the configuration of modules in a first embodiment.

In general, the modules refer to components, such as software and hardware, which can be logically separated. That is, the modules in this exemplary embodiment refer to modules in the hardware configuration as well as modules in a program. Accordingly, in this exemplary embodiment, a program, an apparatus, a system, and a method will also be explained. Furthermore, modules correspond to functions in an approximately one-to-one manner. However, in actuality, one module may be realized by one program or a plurality of modules may be realized by one program. Alternatively, one module may be realized by a plurality of programs. Furthermore, a plurality of modules may be executed by a computer or one module may be executed by a plurality of computers in a distributed or parallel environment. In addition, 'connection' referred hereinafter includes physical connection and logical connection.

In addition, a system may be realized by connecting a plurality of computers, hardware, apparatuses, and the like to one another in a network or may be realized by a computer, hardware, an apparatus, and the like.

In this exemplary embodiment, an image input module 11, a first pixel/second pixel identification information input module 12, a region division module 13, a second pixel identification module 14, a pixel value change module 15, a compression module 16, a compression image storage module 17, an image editing module 18, and an output module 19 are provided as shown in FIG. 1.

The image input module 11 is connected to the region division module 13 and is input with an image. Here, the image includes a binary image, a multilevel image (color image), and the like. In addition, the image may be a single image or plural images.

The first pixel/second pixel identification information input module 12 is connected to the region division module 13 and is input with information used to identify pixels within the image input by the image input module 11 as either a first pixel whose pixel value is not to be changed or a second pixel whose pixel value is to be changed. The information used to identify corresponds to the image input by the image input module 11. Specifically, the first pixel corresponds to a natural image or the like, and the second image corresponds to a text/figure or the like. Moreover, the information used to identify is information used to separate the image, which is input by the image input module 11, into the first and second pixels.

The region division module 13 is connected to the image input module 11, the first pixel/second pixel identification information input module 12, and the second pixel identification module 14. The region division module 13 divides the image, which is input by the image input module 11, into regions. The divided regions are transmitted to the second pixel identification module 14 together with the identification information input by the first pixel/second pixel identification information input module 12. Specifically, the image input by the image input module 11 is divided into blocks (rectangles). Hereinafter, an example of dividing an image into blocks will be mainly described.

The second pixel identification module 14 is connected to the region division module 13 and the pixel value change module 15. The second pixel identification module 14 identifies a second pixel among the image (image including a first pixel and a second pixel) divided by the region division module 13. A result of the identification is transmitted to the pixel value change module 15.

The pixel value change module 15 is connected to the second pixel identification module 14 and is also connected to the compression module 16 or the image editing module 18. In the case when the second pixel identified by the second pixel identification module 14 is included within a region divided by the region division module 13, a value of the second pixel is changed through a filtering process so as to be a predetermined value. To change the value of the second pixel through the filtering process so as to be a predetermined value includes, for example, changing the value of the second pixel in a direction in which a value after the filtering process using a high pass filter (wide band pass filter) becomes zero and changing the value of the second pixel in a direction in which a value of power after the filtering process using the high pass filter becomes a minimum. The direction in which the value becomes zero includes '0' and brings a value approximate to '0.' The direction in which the value of power becomes a minimum includes a minimum value as the value of power at that time and brings a value approximate to the minimum value. In addition, the process of changing the value of the second pixel in the direction in which the value of power becomes minimal is performed in the case when a predetermined number or more of consecutive second pixels identified by the second pixel identification module 14 are included within a region divided by the region division module 13.

Further, in the process by the pixel value change module 15, for example, pixel values are sequentially changed. Specifically, a value of a next pixel is changed on the basis of a pixel for which the changing process has been completed.

Furthermore, in the case when a negative value is included in a filter coefficient used when a value of a pixel is changed by the pixel value change module 15, the filter coefficient is changed in the direction in which the filter coefficient becomes zero. Alternatively, the filter coefficient is changed to be equal to or larger than zero.

In addition, an order of the pixel value change using the pixel value change module 15 may start from a plurality of different directions within an image. Specifically, a starting point for raster scan may be an upper left end or a lower right end, and the direction of raster scan may be a horizontal direction or a vertical direction. Details will be described later.

The image input module 11 to the pixel value change module 15 will now be described more specifically.

In this exemplary embodiment, an image is input by the image input module 11 and identification information is input by the first pixel/second pixel identification information input module 12. Hereinafter, an explanation will be made by using compensation information as a main example of the identification information.

For example, the compensation information is binary data, that is, '1' indicates extracted text and line drawing part '0' indicates the other parts. The size of the binary data is the same as that of the input image. In this exemplary embodiment, a process of properly setting (that is, compensating for) a pixel value of apart in which the compensation information is '1' is performed. Thus, it is possible to stably increase a compression rate of an image including a compensated image, for example.

First, a region including compensated pixels is extracted by the region division module 13. An explanation on the region will now be made by using a pixel block (rectangle) as an example.

Then, the second pixel identification module 14 determines as to whether or not a compensated pixel exists in a pixel block. If the second pixel identification module 14 determines that a compensated pixel exists in the pixel block, the pixel value change module 15 calculates a value of the compensated pixel.

The size or location of the pixel block varies. In addition, there are various kinds of methods of calculating the compensated pixel value.

(1) In the case of performing JPEG compression, a pixel block corresponding to 8×8, which is the same as in JPEG, is extracted.

(1-1) Further, a compensated pixel value, which brings zero run of a DCT coefficient to continue, is calculated. In addition, the calculation process is an example of a process of changing a compensated pixel value in the direction in which a value after the filtering process becomes zero.

(1-2) Alternatively, a compensated pixel value, at which norm of a DCT coefficient is a minimum, is calculated. In addition, the calculation process is an example of a process of changing a compensated pixel value in the direction in which a value of power after a filtering process becomes zero.

(2) In the case of performing JPEG2000 compression, one of the following methods is used.

(2-1) Compensation is performed for each pixel in the order of raster scan. The pixel block size is assumed to be the size of a high pass filter. A compensated pixel value that brings an output value of a high pass filter to be zero is used. In addition, the calculation process is an example of a process of changing a compensated pixel value in the direction in which a value after a filtering process becomes zero.

(2-2) A pixel block (first predetermined region) having predetermined size is extracted with a first compensated pixel as an upper left end, and a pixel value within the pixel block is determined such that a power value of an output of a high pass filter within the block becomes a minimum. In addition, the calculation process is an example of a process of changing a compensated pixel value in the direction in which the value of power after the filtering process becomes zero.

(2-3) A pixel block (second predetermined region) having predetermined size is extracted with the first compensated pixel as the upper left end. Then, when a non-compensated pixel does not exist in the block, a compensated pixel value that brings an output value of the high pass filter to be zero is calculated for each pixel. When a non-compensated pixel exists, a pixel value within the first predetermined region is determined so that the power value of an output of the high pass filter in the first predetermined region becomes a minimum.

The compression module 16 is connected to the pixel value change module 15 and the compression image storage module 17. The compression module 16 compresses an image including pixels changed by the pixel value change module 15.

The compression image storage module 17 is connected to the compression module 16 and stores an image compressed by the compression module 16.

The image editing module 18 is connected to the pixel value change module 15 and the output module 19. The image editing module 18 edits an image including pixels changed by the pixel value change module 15.

The output module 19 is connected to the image editing module 18 and outputs an image edited by the image editing module 18. Specifically, the output module 19 may be a display or a printer, for example.

2. Basic Method

An explanation will be made to facilitate understanding of basic concept of a process performed by the pixel value change module 15. An object of the basic concept is to improve a compression rate, and there are following three concepts.

(First Concept)

A pixel value is set such that the number of transform coefficients, which are zero, is made as many as possible.

(Second Concept)

A power value of a transform coefficient output value is made as small as possible.

(Third Concept)

A combination of the first concept and the second concept corresponds to a third concept.

3. Case of Applying the First Concept to JPEG

In the case of applying the first concept to JPEG, a compensated pixel value is set such that the zero run length of a DCT coefficient in the order of zigzag scan becomes large.

3.1. Case of Applying the First Concept to Two-Dimensional DCT

Here, it is assumed that a pixel block having 8×8 is 64-dimensional pixel value vector x. The DCT transform may be considered as 'transform to obtain 64-dimensional transform coefficient vector c from 64-dimensional pixel value vector x by using DCT matrix D of 64×64'. Such relationship may be expressed in the following Expression 1.

$$c = Dx \qquad (1)$$

For example, let $(i, j)$ be the pixel location of 8×8 block, $(u, v)$ be a two-dimensional frequency, $S_{vu}$ be a transform coefficient, and $s_{ji}$ be a pixel value. Here, it is assumed that $(i, j)$ and $(u, v)$ indicate (column number, row number). 8×8 DCT transform is expressed by the following Expression 2.

$$S_{vu} = \frac{1}{4} C_u C_v \sum_{i=0}^{7} \sum_{j=0}^{7} s_{ji} \cos\frac{(2i+1)u\pi}{16} \cos\frac{(2j+1)v\pi}{16} \qquad (2)$$

Inverse transform is expressed by the following Expression 3.

$$s_{ji} = \frac{1}{4} \sum_{u=0}^{7} \sum_{v=0}^{7} C_u C_v S_{vu} \cos\frac{(2i+1)u\pi}{16} \cos\frac{(2j+1)v\pi}{16} \qquad (3)$$

Here, conditions of the following Expression 4 are applied.

$C_u, C_v = 1/\sqrt{2}$ for $u, v = 0$ $C_u, C_v = 1$ otherwise $\qquad (4)$

Further, assuming that components within the vector x are arranged in the order of $(i_0, i_0), (i_1, i_1), \ldots, (i_{63}, i_{63})$ and that components within the vector c are arranged in the order of $(u_0, v_0), (u_1, v_1), \ldots, (u_{63}, v_{63})$, a component $D_{ts}$ in the 't' row and 's' column of matrix D may be obtained by Expression 5.

$$D_{ts} = \frac{1}{4} C_{u_t} C_{v_t} \cos\frac{(2i_s+1)u_t\pi}{16} \cos\frac{(2j_s+1)v_t\pi}{16} \qquad (5)$$

In the same manner, $D^{-1}{}_{ts}$, which is a component of matrix $D^{-1}$, may be obtained by Expression 6.

$$D_{ts}^{-1} = \frac{1}{4} C_{u_s} C_{v_s} \cos\frac{(2i_t+1)u_s\pi}{16} \cos\frac{(2j_t+1)v_s\pi}{16} \qquad (6)$$

Here, the order of $(u_0, v_0), (u_1, v_1) (u_{63}, v_{63})$ is a zigzag order from a low-frequency component to a high-frequency component. In addition, it is assumed that among 64 image blocks, a pixel for which compensation is not to be performed will be referred to as an 'A' pixel and a pixel for which compensation is to be performed will be referred to as a 'B' pixel. The order of $(i_0, j_0), (i_1, j_1), \ldots, (i_{63}, j_{63})$ is set such that the 'A' pixel is first arranged and the 'B' pixel is arranged last.

Hereinafter, the dimensional of the vector x is assumed to be 'N' for the purpose of general description. In this case, N=64.

It is now assumed that the number of 'A' pixels is 'N-b' and the number of 'B' pixels is 'b'. Here, pixel values of the 'B' pixels, which are compensated pixels, are obtained. Therefore, Expression 1 is assumed to be simultaneous equations having pixel values of 'b' pieces of B pixels as unknowns.

In this case, it is preferable to set 'N' or less unknowns because Expression 1 is simultaneous equations with N unknowns. In addition, since the compression rate is generally high when the DCT coefficient is zero, all of the 'b' DCT coefficients are assumed to be '0'.

Under the conditions described above, Expression 1 becomes the following Expression 7.

$$\begin{pmatrix} c_0 \\ 0 \end{pmatrix} \begin{matrix} \beta_{N-b} \\ \beta_b \end{matrix} = D \begin{pmatrix} x_A \\ x_B \end{pmatrix} \begin{matrix} \beta_{N-b} \\ \beta_b \end{matrix} \quad (7)$$

Vector $x_A$ denotes a vector indicating a known non-compensated pixel, vector $x_B$ denotes a vector indicating an unknown compensated pixel, and vector $c_0$ denotes 'N-b' DCT coefficients starting from a low-frequency component in the order of zigzag scan.

Since Expression 7 is a linear equation with 'N' unknowns, the unknown vector $x_B$ can be obtained.

3.2. Case of Applying the First Concept to One-Dimensional DCT

The same method may be applied to one-dimensional DCT.

Here, a compensated pixel value that causes high-frequency components of DCT coefficients in the horizontal direction to be zero will be obtained.

First, an image is divided into blocks of 1 row×8 columns.

Pixel blocks generated by the division are indicated by a column vector x.

DCT coefficients of the vector x are assumed to be a column vector c.

Here, DCT transform matrix D of 8×8 is considered. $D_{ts}$, which denotes a component in the 't' row and 'j' column of the matrix D, may be obtained by Expression 8.

$$D_{ts} = \frac{1}{2} C_t \cos \frac{(2s+1)t\pi}{16} \quad (8)$$

The same process described above may be performed for the matrix D and the vector x.

4. Case of Applying the Second Concept to JPEG

Vector $x_B$ that causes the norm of a DCT coefficient to be a minimum is obtained (refer to Expression 9).

$$x_B = \underset{x_B}{\operatorname{argmin}} \left\| D \begin{pmatrix} x_A \\ x_B \end{pmatrix} \right\| \quad (9)$$

5. Supplement

In the above, when the zero run length or norm of a DCT coefficient is measured, it may be possible to measure the zero run length or norm of a vector after quantization.

6. Case of Applying the First and Second Concepts to JPEG2000

JPEG2000 can perform lossless compression. Accordingly, it may be possible to adopt a compensation technique for improving a lossless compression rate. Hereinafter, it is assumed that a pixel for which compensation is not to be performed will be referred to as an 'A' pixel and a pixel for which compensation is to be performed will be referred to as a 'B' pixel.

Let p(x,y) be a compensated pixel value. In general, it is considered optimal to adopt a value of p(x, y) that causes a power value of high-frequency components in DWT (discrete wavelet transform) to be a minimum. For example, it is preferable to obtain p(x, y) that causes a result, which is obtained by partial-differentiating a sum of power values of high-frequency components, to be zero. However, this approach is not practical because an amount of calculation when the number of compensated pixels is large is vast. In addition, the minimum power norm (corresponding to the second concept) does not necessarily directly linked to improvement of the lossless compression rate. Therefore, in this exemplary embodiment, the following method is used.

(1) A compensated pixel region is limited and pixels in the limited region are compensated by using the local minimum power norm. Thus, a processing load is reduced.

(2) In addition, in order to increase the lossless compression rate, a compensated pixel value that causes an output of a filtering process of a high pass filter to be zero is selected if possible.

6.1. Ideal Compensation

Before describing the exemplary embodiment in detail, ideal compensation will be described.

Hereinafter, let p(x, y) be a pixel value. Here, 'x' denotes an index indicating a row and 'y' denotes an index indicating a column. Moreover, it is assumed that a pixel for which compensation is not to be performed will be referred to as an 'A' pixel and a pixel for which compensation is to be performed will be referred to as a 'B' pixel. In addition, let $U_B$ be a set of 'B' pixels corresponding to the position (x, y).

Figure 2:
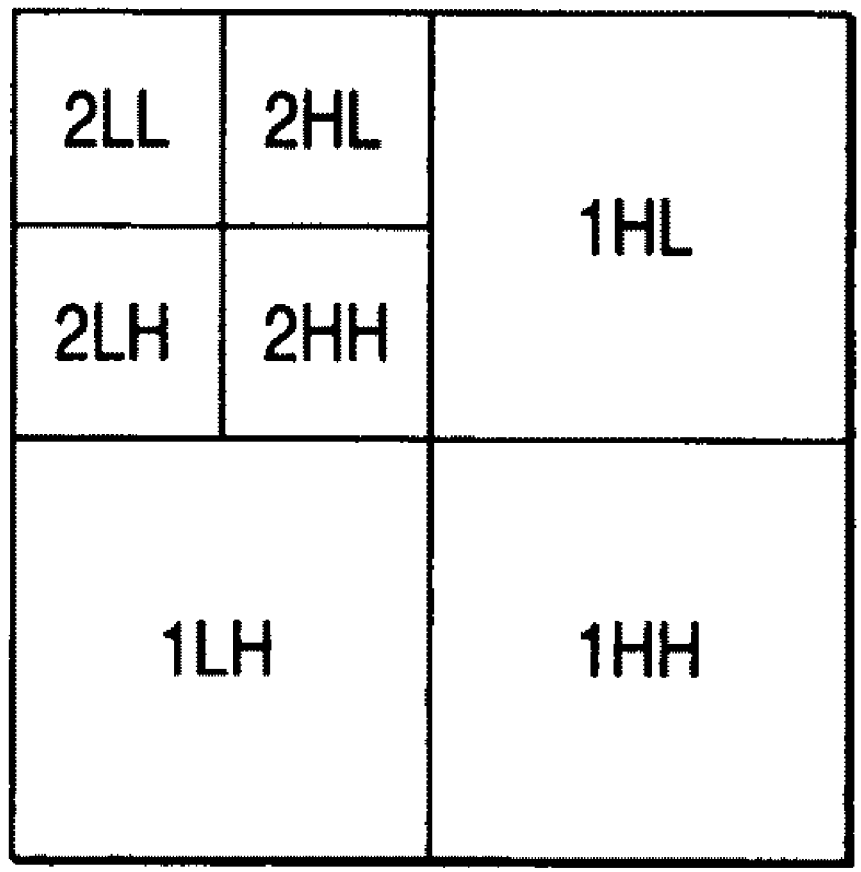
FIG. 2 is a view explaining an example in which two-step DWT processing is performed.

An input image is divided into plural frequency regions of 1HH, 1HL, 1LH, 2HH, 2HL, 2LH, . . . , xLL by performing DWT (discrete wavelet transform). FIG. 2 is a view illustrating an example in which two-step DWT is performed. That is, the input image is divided into plural frequency regions of 1HH, 1HL, 1LH, 2HH, 2HL, 2LH, and 2LL.

A value of each frequency region is a filter output of an input pixel value. Accordingly, the value of each frequency region becomes a function of p(x, y). At this time, a sum of power values in respective frequency bands may be made as small as possible in order to increase the compression rate of JPEG2000. Thus, an evaluation function shown in the following (Expression 10) is defined.

$$E_{total} = \sum_c w_c E_c \quad (10)$$

Here, $E_c$ denotes the sum of power in a frequency band c, and $w_c$ denotes a weighting coefficient in each frequency band. 'c' denotes number attached to the respective frequency bands of 1HH, 1HL, 1LH, 2HH, 2HL, 2LH, . . . , xLL. In general, $w_c$ is a high value in the case of high-frequency components. In addition, $w_c$ is a value that is higher in the case of HH than in the case of HL or LH.

In this case, obtained may be p(x, y) that makes a value of Etotal (refer to Expression 10) as small as possible. That is, the simultaneous equations shown in Expression 11 may be solved.

$$\frac{\partial Etotal}{\partial p(x, y)} = 0 \qquad (11)$$

$$(x, y) \in U_B$$

The equation in Expression 11 is simultaneous equations with $|U_B|$ unknowns (where, the number of 'B' pixels=$|U_B|$). Therefore, when the number of 'B' pixels is large, it is not practical to solve Expression 11.

Furthermore, when the sum of power values is small as described above, optimization may be realized by the lossy compression. However, the optimization may not be realized by the lossless compression. In the lossless compression, a case in which equal pixel values continue even if a power value is high may be more desirable than a case in which a number of data having small power values exists.

6.2. Explanation on Basic Concept

Based on that described above, a method of calculating a compensated pixel using two norms (first concept and second concept) shown below and a hybrid method (third concept) will be described.

(1) Output Value Zero Norm (Corresponding to the First Concept)

In the DWT which is a transform method of JPEG2000, an input image is divided into two images using a low pass filter and high pass filter. If it is possible to make an output of the high pass filter zero, the compression rate (particularly, lossless compression rate) can be increased.

(2) Local Power Minimum Norm (Corresponding to the Second Concept)

By locally performing a process of minimizing a power value but not performing the process for the entire image, it is possible to reduce the processing load.

(3) Hybrid Method (Corresponding to the Third Concept)

This is a method using advantages of both the output value zero norm and the local power minimum norm.

Hereinafter, a basic technique of the proposed methods will be described.

6.3. Definition

Preparation of the explanation will be made below.

6.3.1. Input Pixel Value

In the one-dimensional case, let $p(x)$ be a value of an input pixel. In the two-dimensional case, let $p(x, y)$ be a value of an input pixel.

Moreover, it is assumed that a pixel (including a pixel for which compensation has been completed) for which compensation is not to be performed will be referred to as an 'A' pixel and a pixel for which compensation is to be performed will be referred to as a 'B' pixel.

6.3.2. One-Dimensional Filter

Let 'N' be the tap length of a one-dimensional high pass filter and $h(i)$ be a coefficient thereof where i=0, 1, 2, . . . , N-1.

Then, an output of a high pass filter is assumed to be $H_j$ in which $p(j)$ is a right-end input of the filter. That is, $H_j$ is expressed by the following Expression 12.

$$H_j = \sum_{i=0}^{N-1} \{h(i) \times p(j + i - N + 1)\} \qquad (12)$$

In addition, a high pass filter at the location j may be expressed as $H_j$.

6.3.3. Two-Dimensional Filter

In JPEG2000, a one-dimensional filter is defined. A two-dimensional filter is realized by horizontally and vertically arranging two one-dimensional filters. For the convenience of explanation, a horizontally and vertically separated type two-dimensional filter is assumed to be a non-separated type two-dimensional filter.

Here, horizontally and vertically separated filters are applied (the filters may be the same). In addition, let one-dimensional filters be $h_1(i)$ (where, i=0, 1, 2, . . . , $N_1$-1) and be $h_2(i)$ (where, i=0, 1, 2, . . . , $N_2$-1). This is expressed as a vector as shown in Expression 13.

$$P_1 = \begin{pmatrix} h_1(0) \\ h_1(1) \\ M \\ h_1(N_1 - 1) \end{pmatrix}, P_2 = \begin{pmatrix} h_2(0) \\ h_2(1) \\ M \\ h_2(N_2 - 1) \end{pmatrix} \qquad (13)$$

A non-separated type two-dimensional filter kernel K (matrix of $N_1 \times N_2$) may be calculated by Expression 14.

$$K = P_1 P_2^T = \begin{pmatrix} h_1(0) \\ h_1(1) \\ M \\ h_1(N_1 - 1) \end{pmatrix} (h_2(0) \quad h_2(1) \quad \wedge \quad h_2(N_2 - 1)) \qquad (14)$$

Hereinafter, components within the filter kernel K will be referred to as K(i, j) (where i=0, 1, 2, . . . , $N_1$-1 and j=0, 1, 2, . . . , $N_2$-1).

In addition, let $H_{ij}$ be an output of a filter in which a pixel (i, j) is a lower-right-end input. $H_{ij}$ may be expressed by the following Expression 15.

$$H_{ij} = \sum_{m=0}^{N_1-1} \sum_{n=0}^{N_2-1} \left\{ K(m, n) \times p\begin{pmatrix} i + m - N + 1, \\ j + n - N + 1 \end{pmatrix} \right\} = 0 \qquad (15)$$

In addition, a filter at the position (i, j) may be expressed as $H_{ij}$.

In addition, it is possible to define a two-dimensional FIR filter in which an input image is input with respect to 'x' equal to or larger than '1' so as to obtain outputs of xHH, xHL, xLH, and xLL. This becomes a filter having a high tap number generated by applying coefficients of the first-stage filter which has been described until now. In the case of obtaining an output subsequent to the second stage, it is preferable to use the two-dimensional filter.

6.4. Output Value Zero Norm

A method of calculating a compensated pixel value using the output value zero norm will now be described.

In this norm, a process of determining a compensated pixel value is performed in the raster order for the purpose of making an output of a high pass filter zero.

6.4.1. Case of One Dimension

Figure 3:
FIG. 3 is an explanatory view illustrating an example of a pixel arrangement.
Figure 4:
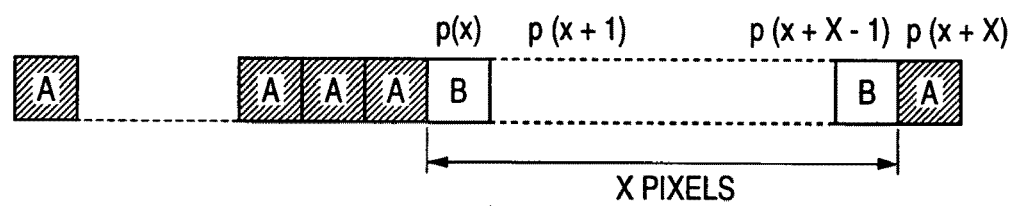
FIG. 4 is an explanatory view illustrating an example of the pixel arrangement.
Figure 5:
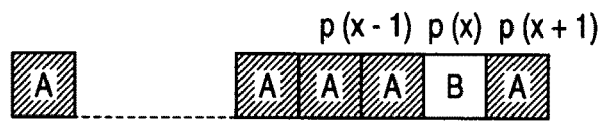
FIG. 5 is an explanatory view illustrating an example of the pixel arrangement.

It is assumed that $p(x)$ is a 'B' pixel, and $p(x)$ will now be compensated (refer to FIG. 3). Since the compensation is performed in the order of raster scan (in FIG. 3, from left to right and then leftward in a lower line when reaching a right end), it may be assumed that pixels positioned at left and upper sides of $p(x)$ are all 'A' pixels.

Here, p(x) is defined such that an output of a high pass filter in which p(x) is a right-end input becomes zero. That is, p(x) may be defined as shown in Expression 16.

$$H_x = \sum_{i=0}^{N-1} \{h(i) \times p(x+i-N+1)\}$$
$$= 0$$

p(x) may be obtained by the following Expression 17.

$$p(x) = -\frac{1}{h(N-1)} \sum_{i=0}^{N-2} \{h(i) \times p(x+i-N+1)\} \qquad (17)$$

6.4.2. Case of Two Dimension

It is assumed that p(x, y) is a 'B' pixel, and p(x) will be compensated. Since the compensation is performed in the order of raster scan, it may be assumed that pixels positioned at left and upper sides of p(x, y) are all 'A' pixels. In the same manner as the one-dimension case, an unknown value shown in Expression 18 is only p(x, y), and accordingly, it is possible to calculate p(x, y).

$$H_{xy} = 0 \qquad (18)$$

6.4.3. Case of Application to a Plurality of Frequency Bands

In DWT, an input image is finally divided into plural frequency bands. It is difficult to apply the output value zero norm to plural frequency bands. This is because it is not possible to obtain p(x, y) that causes values in all of the plural frequency bands to be zero.

Accordingly, it is reasonable to make a value in only one of frequency bands zero. For example, a value of 1HH is made zero with paying attention to only 1HH.

6.5. Local Power Minimum Norm

A process of calculating a compensated pixel value based on the power minimum norm is locally performed to reduce an amount of operation and determine consecutive pixel values. In this norm, plural compensated pixel values are determined at the same time.

6.5.1. Case of One Dimension

First, a one-dimension case will be described.

Figure 6:
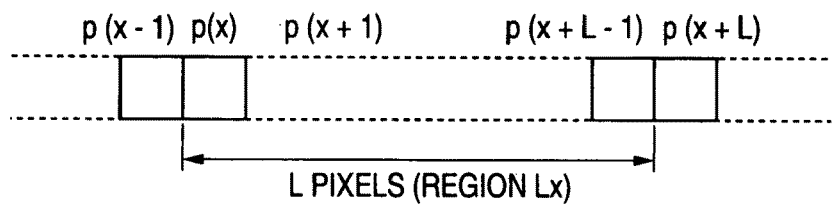
FIG. 6 is an explanatory view illustrating an example of the pixel arrangement.

As shown in FIG. 6, an 'L' pixel region (region Lx) where the pixel p(x) is the leftmost pixel is assumed. In the local power minimum norm, the region Lx, that is, values of 'L' pixels of p(x) to p(x+L−1) are determined in the power minimum norm.

Figure 7:
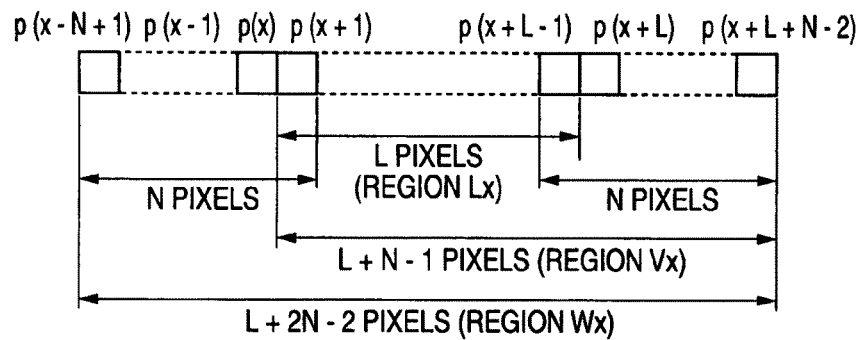
FIG. 7 is an explanatory view illustrating an example of the pixel arrangement.

Further, let Vx be a set of j in which at least one input pixel of an N-tap filter $H_j$ belongs to a region [Lx ∩ $U_B$] (that is, a set of pixels that belong to the region Lx and that are 'B' pixels). If the range of the region Vx becomes a maximum, j=x to x+L+N−2. In addition, a range where input pixels of the filter $H_j$ exist (where, j∈Vx) is assumed to be a range Wx. If the range of the region Wx becomes a maximum, j=x−N+1 to x+L+N−2 (refer to FIG. 7).

Under the condition described above, pixel values of p (x) to p(x+L−1) are determined by using the power minimum norm. In this case, it is preferable to set the pixel values of p(x) to p(x+L−1) such that a sum of power values of $H_j$ is smallest. First, a sum of squares of $H_j$ (where, j∈Vx) is assumed to be Ex. For example, when p(x) to p(x+L−1) are 'B' pixels, Ex may be expressed by the following Expression 19.

$$Ex = \sum_{j \in Vx} H_j^2 = \sum_{j=x}^{x+L+N-2} H_j^2 \qquad (19)$$

Ex is a function of p(x) (x∈[$U_B$ ∩ Wx]) (where, $U_B$ is a set of x that is a 'B' pixel). Therefore, in the same manner as described in 6.1, p(x) can be obtained by solving simultaneous equations shown in the following Expression 20.

$$\frac{\partial Ex}{\partial p(x)} = 0 \qquad (20)$$
$$x \in [U_B \cap Wx]$$

Those obtained by solving the equations shown in Expression 20 are pixel values p(x−N+1) to p(x+L+N−2) of the region Wx. However, those adopted as actual compensated pixel values are only pixel values p(x), p(x+1), . . . , p(x+L−1) of the region Lx. This is because it is better to calculate the compensated pixel value by using 'A' pixels, which are located outside Wx, in the case of pixel values p(x−N+1) to p(x−1) and p(x+L) to p(x+L−2) of a region Wx−Lx.

In the case of minimizing a power value with respect to the entire image, X∈$U_B$ has been applied. However, in this algorithm, it is possible to reduce an amount of operations by applying X∈[$U_B$∩Wx]. In addition, since the pixel values can be changed in a stepwise manner in the region Lx, the pixel value gap described in the output value zero norm does not easily occur.

6.5.2. Case of Two Dimension

Figure 8:
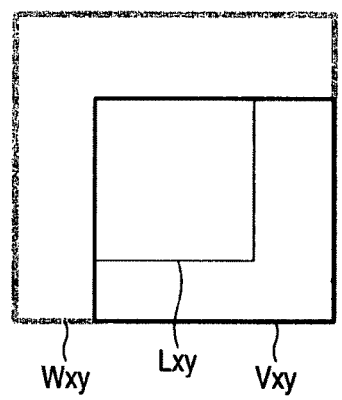
FIG. 8 is an explanatory view illustrating an example of a two-dimensional region.

A case of a two-dimensional filter may be considered in the same manner as described above. An explanation will be made referring to FIG. 8.

(1) 'B' pixels within a two-dimensional region Lxy are compensated. The region Lxy has an arbitrary shape.

(2) A local power value of an output value when using a two-dimensional filter K is minimized.

(3) A set of positions (i, j) where at least one input pixel of a filter $H_{ij}$ belongs to the region Lxy and is a 'B' pixel is assumed to be Vxy.

(4) Under the condition of the position (i, j)∈Vxy where the filter $H_{ij}$ exists, a range where the input pixel (x, y) of the filter $H_{ij}$ exists is assumed to be Wxy.

The region Wxy is obtained by expanding the region Lxy to the maximum left and right by '$N_2$−1' pixels and expanding the region Lxy to the maximum up and down by '$N_1$−1' pixels.

It is desirable to obtain the pixel value p(x, y) (where (X, y)∈$U_B$) within the region Lxy that minimizes a variable Exy shown in the following Expression 21 under the condition described above.

$$Exy = \sum_{(i,j) \in Vxy} H_{ij}^2 \qquad (21)$$

That is, it is preferable to solve the equation shown in the following Expression 22.

$$\frac{\partial Exy}{\partial p(x, y)} = 0 \qquad (22)$$

$$(x, y) \in [U_B \cap W_{xy}]$$

In addition, after solving the equation shown in Expression 22, only p(x, y) (where (x, y)∈[$U_B$ ∩ Lxy]) is selected.

In the same manner as Expression 10, minimization shown in the following Expression 23 may be performed by using the weighting factor $w_c$ set for each frequency band. $E_{xyc}$ is Exy of the region Lxy belonging to the frequency band c.

$$Etotalxy = \sum_c w_c E_{xyc} \tag{23}$$

6.5.3. Supplement

The definition of the set Vxy has been made as a "set of positions (i, j) where at least one input pixel of a filter $H_{ij}$ belongs to the region Lxy and is a 'B' pixel." More simply, the set Vxy may be defined as a "set of positions (i, j) where at least one input pixel of the filter $H_{ij}$ belongs to the region Lxy."

This is the same for the one-dimensional case.

The set Vx may be defined as a "set of 'j' positions that allow at least one input pixel of the $H_j$ to belong to the region Lx."

6.5.4. Case of Performing Sub-Sampling

Here, it will be described about a case in which filtering is executed by performing sub-sampling in the same manner as in DWT.

Hereinbefore, the power value has been defined as expressed in Expression 19 or 21. However, in DWT, sub-sampling of 2:1 is performed. For this reason, more precisely, one of the equations shown in Expression 24 is used in Expression 19 indicating the power value Ex.

$$Ex = \sum_{j \in [Vx \cap odd]} H_j^2 \text{ or } Ex = \sum_{j \in [Vx \cap even]} H_j^2 \tag{24}$$

It is determined by the filtering phase when applying DWT whether 'j' will be an odd number or an even number. That is, when the sub-sampling phase is known, it is preferable to perform optimization by using any one of the equations.

More generally, there is shown Exy regarding frequency bands nHH, nHL, and nLH in the two-dimensional case of performing n-stage DWT. In this case, a sub-sampling rate is $2^n$=1. Accordingly, the sub-sampling phase becomes modulo $2^n$. Expression 21 changes to the following Expression 25.

$$Exy = \sum_{(i,j) \in Vxy, i \,[\text{mod} 2^n]=m_i, j\,[\text{mod} 2^n]=m_j} H_{ij}^2$$

Here, $m_i$ and $m_j$ are sub-sampling phases (0 to $2^n$−1). (25)

When performing the sub-sampling as described above, conditions of simultaneous equations are not sufficient, and accordingly, the solution may be indefinite. In this case, it is preferable to copy pixel values from adjacent 'A' pixels until the solution is not indefinite by using a result of processing in which the sub-sampling is not performed or to reduce the number of unknowns by making values of a plurality of unknowns equal.

6.6. Hybrid Method

Next, a combination of the output value zero norm and the local power minimum norm is considered.

Compensation, which is basically in the order of raster scan and uses the output value zero norm, is performed. In this case, the range to which the output value zero norm is to be applied is limited.

Figure 9:
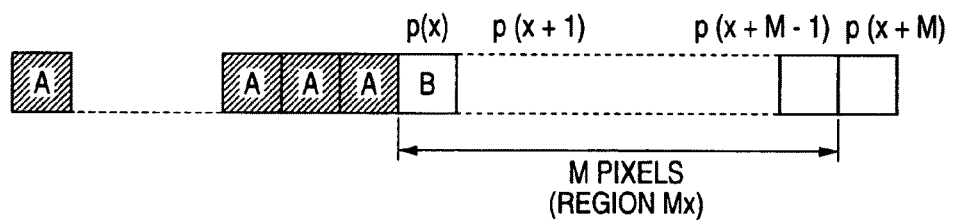
FIG. 9 is an explanatory view illustrating an example of the pixel arrangement.

First, a region Mx shown in FIG. 9 is assumed. That is, it is assumed that p(x) is a left end and a region of 'M' pixels including p(x) is Mx.

Then, as will be described below, the output value zero norm and the local power minimum norm switch to each other.

When an 'A' pixel does not exist within the region Mx, p(x) is calculated by using the output value zero norm.

When an 'A' pixel exists within the region Mx, a pixel value within the region Lx is calculated by using the local power minimum norm.

The pixel value p(x) that is calculated next is a first 'B' pixel found by making a search in the raster order.

By performing the switching described above, an output value can be made zero if possible and a compensated value suitable even for the lossy coding can be calculated.

In the above, the hybrid method in the one-dimensional case has been described. However, this may be applied to a two-dimensional case in the same manner. Hereinafter, a typical algorithm will be described.

First, a region Mxy is defined at the right and lower sides of p(x, y).

(1) A next compensated pixel (B pixel) is searched in the raster order.

(2) A 'B' pixel that is first searched is to be p(x, y).

(3) Region Mxy is evaluated.

(3-1) When an 'A' pixel does not exist within the region Mxy, a compensated value of p(x, y) is calculated on the basis of the output value zero norm.

(3-2) When the 'A' pixel exists within the region Mxy, compensation of the region Lxy including p(x, y) is performed by using the local power minimum norm.

(4) The process returns to (1).

7.7. Limitation of Filter Coefficient

In the filtering methods (output value zero norm and local power minimum norm) described above, a filter coefficient may be a negative value. In the case when the filter coefficient is a negative value, an output value may not be stable. For this reason, when the filter coefficient is a negative value, it is possible to make the filter coefficient zero.

In the case of making a part of filter coefficients zero, it is preferable to normalize all of the filter coefficients such that a sum of the filter coefficient is 1.

8. Specific Example of Compensation Method

A compensation algorithm in the case of JPEG2000 will be described in detail on the basis of that described above.

8.1. Examples of Region

Examples of regions (region Mxy, region Lxy, region Vxy, and Wxy) are shown below.

8.1.1. Region Mxy

Figure 10:
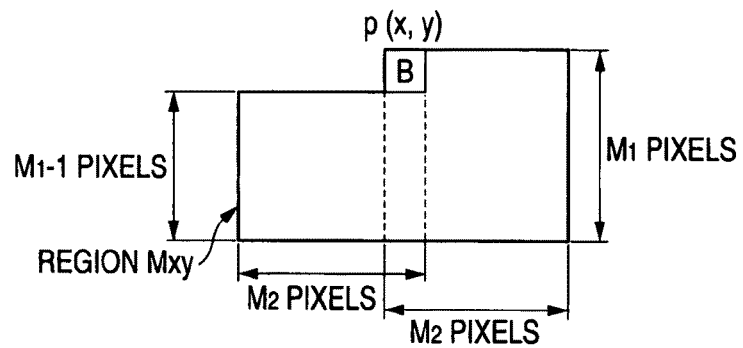
FIG. 10 is an explanatory view illustrating an example of a region.

The region Mxy is defined as shown in FIG. 10. p(x, y) is also included in the region Mxy. As shown in FIG. 10, the region Mxy is determined by p(x, y), $M_1$, and $M_2$.

8.1.2. Region Lxy

Figure 11:
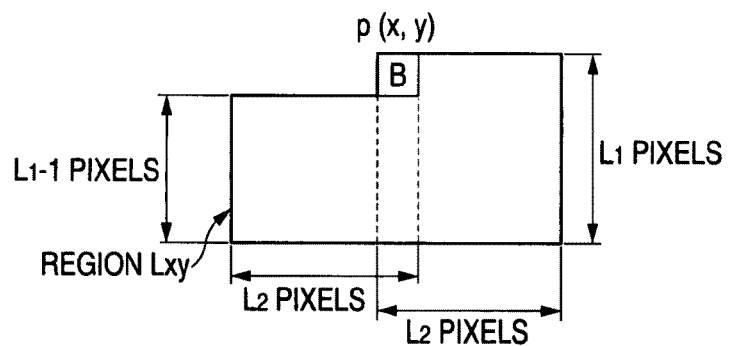
FIG. 11 is an explanatory view illustrating an example of a region.

The region Lxy is defined as shown in FIG. 11. p(x, y) is also included in the region Lxy. As shown in FIG. 11, the region Lxy is determined by p(x, y), $L_1$, and $L_2$. Here, since compensation is performed in the raster order, compensation with respect to left and upper pixels has been already completed. Accordingly, positions of candidates to be compensated are limited to pixels located at the right and lower sides of p(x, y), as shown in FIG. 11.

8.1.3. Region Vxy

The lower right position of the filter kernel K is assumed to be (i, j). The range of (i, j) where at least a pixel of the filter kernel K belongs to the 'B' pixel region Lxy is assumed to be the region Vxy.

Figure 12:
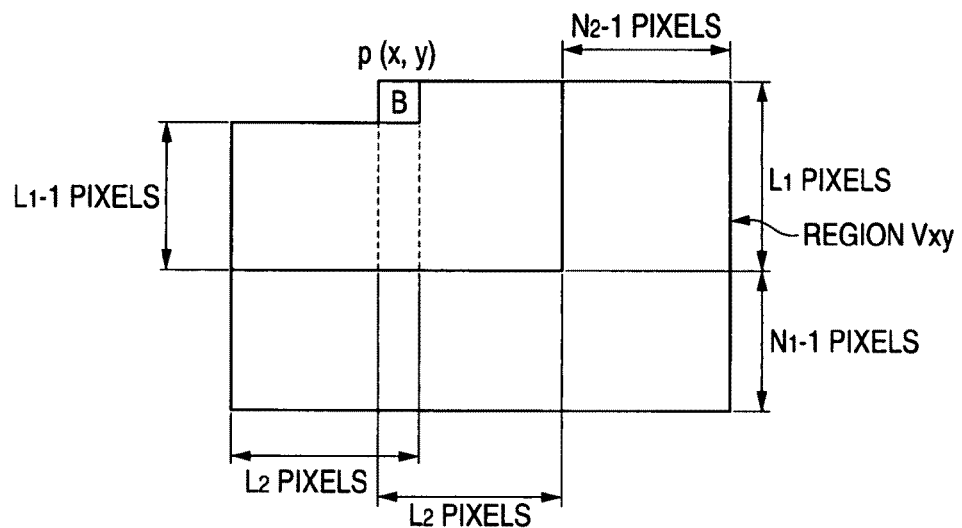
FIG. 12 is an explanatory view illustrating an example of the region.

A maximum range of the region Vxy is shown in FIG. 12. As shown in FIG. 12, the region Vxy is determined by p(x, y), $L_1$, $N_1$, $L_2$, and $N_2$.

8.1.4. Region Wxy

An existing range of input pixels of the filter $H_{ij}$ (where, (i, j)∈Vxy) is assumed to be the range Wxy.

Figure 13:
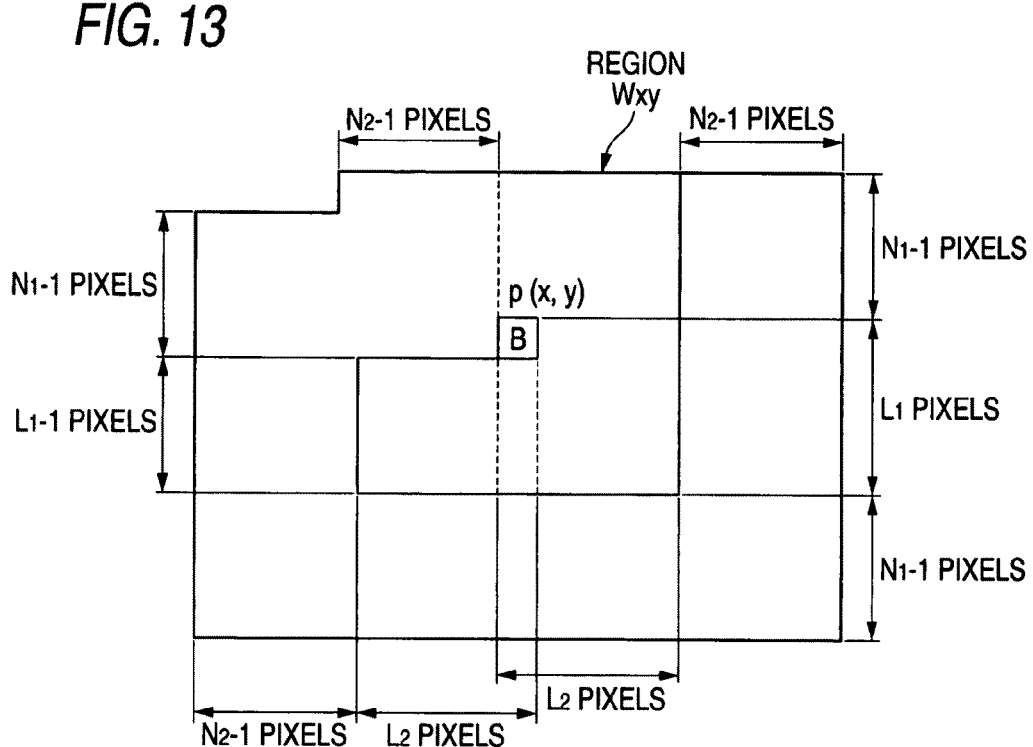
FIG. 13 is an explanatory view illustrating an example of the region.

A maximum range of the region Wxy is shown in FIG. 13. That is, as shown in FIG. 13, the region Wxy is determined by p(x, y), $N_1$, $L_1$, $N_1$, $N_2$, and $L_2$.

8.2. End Point Processing Method

At an end of an image, the filter input position may exist outside the image. In that case, end point processing, such as JPEG2000, is performed. That is, a value of a pixel outside the image is obtained by converting a pixel inside the image using a mirror image.

Figure 14:
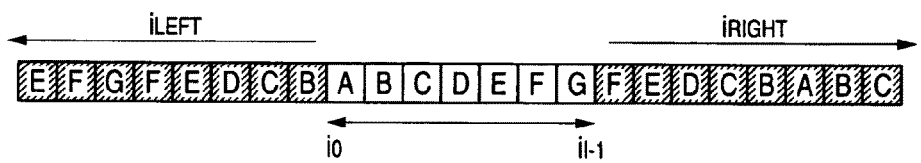
FIG. 14 is an explanatory view illustrating an example of end point processing.

Referring to FIG. 14, white pixels (ABCDEFG) are pixel values within an image. In the case when a filter input goes outside the white pixels, for example, when the filter input goes to the left side, the filter input extends like (GFEDCB) which is a mirror image with respect to 'A'. In the case when the filter input goes to the right side, the filter input extends like (FEDCBA) which is a mirror image with respect to 'G'.

Here, in the case of the output value zero norm, values of all left and upper pixels are assumed to be 'A' pixels. For this reason, it is necessary to set such that even pixels outside an image become 'A' pixels. Therefore, one of the following methods is adopted.

(1) In the case when a 'B' pixel exists within input pixels of Hxy as a result of the end point processing even if an 'A' pixel does not exist within the region Mxy, the compensated pixel value is calculated by using the local power minimum norm. In this case, the region Lxy is assumed to be a region for only a pixel of p(x, y).

(2) In the case when all pixels used for the operation are 'B' pixels, the value of p(x, y) becomes indefinite. In this case, one of the following values is adopted as p(x, y).

(2-1) Pixel value of 'A' pixel found first when input image is raster scanned (2-2) Fixed value (for example, 0 or 128)

(2-3) 'B' pixel is maintained Compensation is performed in the order of another scan after completing scan for a screen of image (refer to 'use of a plurality of scan directions' described in 8.3)

8.3. Use of a Plurality of Scan Directions

As shown in FIGS. 15A to 15D, four kinds of raster scan directions may be used.

That is, referring to direction 1 shown in FIG. 15A, the scan is performed in the right direction with a pixel positioned at an upper left end as a starting point and then movement to a left end of a lower line is made when reaching a right end, which is repeated.

In addition, referring to direction 2 shown in FIG. 15B, the scan is performed in the left direction with a pixel positioned at a lower right end as a starting point and then movement to a right end of an upper line is made when reaching a left end, which is repeated.

In addition, referring to direction 3 shown in FIG. 15C, the scan is performed in the downward direction with the pixel positioned at the upper left end as a starting point and then movement to an upper end of a right line is made when reaching a lower end, which is repeated.

In addition, referring to direction 4 shown in FIG. 15D, the scan is performed in the upward direction with the pixel positioned at the lower right end as a starting point and then movement to a lower end of a left line is made when reaching an upper end, which is repeated.

(1) Method 1 (method of compensating pixels, which cannot be compensated in the direction 1, in another direction.

(1-1) Compensation is performed in the scan direction 1.

(1-2) Image in which compensation has been completed in the direction 1 is compensated in the direction 2.

(1-3) Image in which compensation has been completed in the direction 2 is compensated in the direction 3.

(1-4) Image in which compensating has been completed in the direction 3 is compensated in the direction 4.

(2) Method 2 (method of compensating pixels in a plurality of kinds of scan directions and then finally acquiring a mean value)

(2-1) Compensation is performed in the scan directions 1 to 4.

(2-2) Final output value is created by using a mean value of compensating results in the directions in which the compensating can be performed.

8.4. Other Examples

Hereinbefore, it has been described about the method of compensating pixels by performing raster scan from upper left to lower right. Then, a method of considering a plurality of raster scan directions is considered.

As shown in FIG. 16, there are eight kinds of raster scan directions. That is, the eight kinds of raster scan directions include (1) right direction with a pixel positioned at an upper left end as a starting point, (2) downward direction with a pixel positioned at an upper left end as a starting point, (3) left direction with a pixel positioned at an upper right end as a starting point, (4) downward direction with a pixel positioned at an upper right end as a starting point, (5) right direction with a pixel positioned at a lower left end as a starting point, (6) upward direction with a pixel positioned at a lower left end as a starting point, (7) left direction with a pixel positioned at a lower right end as a starting point, and (8) upward direction with a pixel positioned at a lower right end as a starting point.

'S' directions are extracted from these eight raster scan directions so as to calculate the compensated pixel value $p_s(x, y)$ (where number 's' (s=1, 2, ... ) is granted in the raster scan direction). It is preferable to set a mean value of $p_s(x, y)$ as a final compensated pixel value. That is, the mean value is calculated in the following Expression 26.

$$p(x, y) = \frac{\sum_{s=1}^{S} p_s(x, y)}{S} \quad (26)$$

In addition, the number of cases of extracting the 'S' directions is $2^8-1$.

9. Specific Numeric Example (in the Case of JPEG2000)

Further, a calculation example when performing compensation in the one-dimensional case is shown by using a high pass (reversible) filter of DWT as an example.

In the high pass (reversible) filter of DWT of JPEG2000, h=(−1/2, 1, −1/2), N=3.

Here, it is assumed that Mx region=p(x) to p(x+2) and Lx region=p(x) to p(x+1) in the case when p(x) is a compensated pixel.

Hereinafter, it is assumed that a pixel described as ϕ in specific cases is a 'don't care pixel' 'B' regardless of an 'A' pixel and a 'B' pixel.

9.1. Case 1: Typical Processing

First, a case in which all pixels located at the left side of p(x) are 'A' pixels will be considered.

9.1.1. Case 1-1

The output value zero norm is used.

Figure 17:
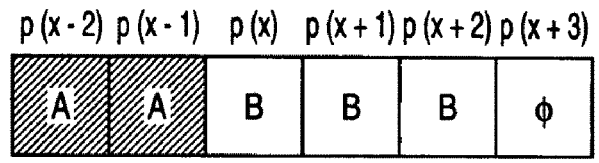
FIG. 17 is an explanatory view illustrating an example of the pixel arrangement.

A case of the pixel arrangement shown in FIG. 17 is considered.

From the following Expression 27, Expression 28 can be obtained. As a result, a value of p(x) can be obtained.

$$-\frac{1}{2}p(x-2) + p(x-1) - \frac{1}{2}p(x) = 0 \quad (27)$$

$$p(x) = 2p(x-1) - p(x-2) \quad (28)$$

9.1.2. Case 1-2

Hereinafter, the local power minimum norm will be used up to case 1-5.

Figure 18:
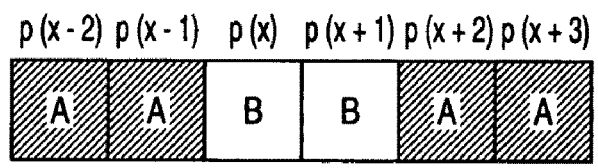
FIG. 18 is an explanatory view illustrating an example of the pixel arrangement.

A case of the pixel arrangement shown in FIG. 18 is considered.

Referring to FIG. 18, the following Expression 29 is obtained.

$$H_0 = -\frac{1}{2}p(x-2) + p(x-1) - \frac{1}{2}p(x) \quad (29)$$

$$H_1 = -\frac{1}{2}p(x-1) + p(x) - \frac{1}{2}p(x+1)$$

$$H_2 = -\frac{1}{2}p(x) + p(x+1) - \frac{1}{2}p(x+2)$$

$$H_3 = -\frac{1}{2}p(x+1) + p(x+2) - \frac{1}{2}p(x+3)$$

'E' is expressed by the following Expression 30.

$$E = \sum_{j=0}^{3} H_j^2 \quad (30)$$

A condition for minimizing 'E' is expressed by the following Expression 31.

$$3p(x) - 2p(x+1) = -\frac{1}{2}p(x-2) + 2p(x-1) - \frac{1}{2}p(x+2) \quad (31)$$

$$-2p(x) + 3p(x+1) = -\frac{1}{2}p(x-1) + 2p(x+2) - \frac{1}{2}p(x+3)$$

When Expression 31 is solved, the following Expression 32 is obtained. Thus, values of p(x) and p(x+1) can be obtained.

$$\begin{pmatrix} p(x) \\ p(x+1) \end{pmatrix} = \frac{1}{10}\begin{pmatrix} -3 & 10 & 5 & -2 \\ -2 & 5 & 10 & -3 \end{pmatrix}\begin{pmatrix} p(x-2) \\ p(x-1) \\ p(x+2) \\ p(x+3) \end{pmatrix} \quad (32)$$

9.1.3. Case 1-3

Figure 19:
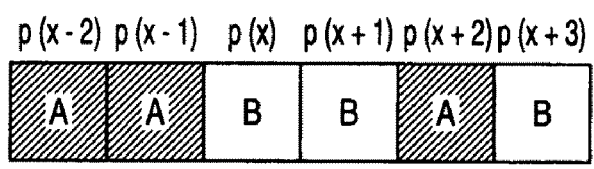
FIG. 19 is an explanatory view illustrating an example of the pixel arrangement.

A case of the pixel arrangement shown in FIG. 19 is considered.

'E' is expressed by the following Expression 33 when using $H_t$ in Expression 29.

$$E = \sum_{j=0}^{3} H_j^2 \quad (33)$$

In this case, there are three unknown values of p(x) p(x+1), and p(x+3). The minimization of 'E' is expressed by the following Expression 34.

$$\begin{pmatrix} p(x) \\ p(x+1) \\ p(x+3) \end{pmatrix} = \frac{1}{14}\begin{pmatrix} -5 & 16 & 3 \\ -4 & 10 & 8 \\ 4 & -10 & 20 \end{pmatrix}\begin{pmatrix} p(x-2) \\ p(x-1) \\ p(x+2) \end{pmatrix} \quad (34)$$

In addition, since the range of Lx is p(x) and p(x+1), only the following Expression 35 is adopted.

$$\begin{pmatrix} p(x) \\ p(x+1) \end{pmatrix} = \frac{1}{14}\begin{pmatrix} -5 & 16 & 3 \\ -4 & 10 & 8 \end{pmatrix}\begin{pmatrix} p(x-2) \\ p(x-1) \\ p(x+2) \end{pmatrix} \quad (35)$$

9.1.4. Case 1-4

Figure 20:
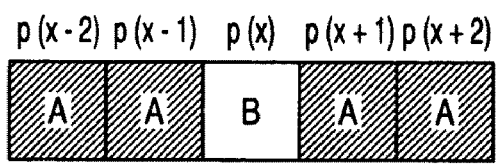
FIG. 20 is an explanatory view illustrating an example of the pixel arrangement.

A case of the pixel arrangement shown in FIG. 20 is considered.

Referring to FIG. 20, the following Expression 36 is obtained.

$$H_0 = -\frac{1}{2}p(x-2) + p(x-1) - \frac{1}{2}p(x) \quad (36)$$

$$H_1 = -\frac{1}{2}p(x-1) + p(x) - \frac{1}{2}p(x+1)$$

$$H_2 = -\frac{1}{2}p(x) + p(x+1) - \frac{1}{2}p(x+2)$$

'E' is expressed by the following Expression 37.

$$E = \sum_{j=0}^{2} H_j^2 \quad (37)$$

p(x) that minimizes 'E' is obtained in the following Expression 38. Thus, a value of p(x) can be obtained.

$$p(x) = \frac{1}{6}\begin{pmatrix} -1 & 4 & 4 & -1 \end{pmatrix}\begin{pmatrix} p(x-2) \\ p(x-1) \\ p(x+1) \\ p(x+2) \end{pmatrix} \quad (38)$$

9.1.5. Case 1-5

Figure 21:
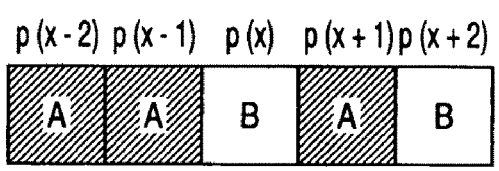
FIG. 21 is an explanatory view illustrating an example of the pixel arrangement.

A case of the pixel arrangement shown in FIG. 21 is considered.

'E' is expressed by the following Expression 39 when using $H_i$ in Expression 36.

$$E = \sum_{j=0}^{2} H_j^2 \qquad (39)$$

The minimization of 'E' is expressed by the following Expression 40.

$$\begin{pmatrix} p(x) \\ p(x+2) \end{pmatrix} = \frac{1}{5}\begin{pmatrix} -1 & 4 & 2 \\ 1 & -4 & 8 \end{pmatrix}\begin{pmatrix} p(x-2) \\ p(x-1) \\ p(x+1) \end{pmatrix} \qquad (40)$$

Since Lx=p(x) top(x+1), only the following Expression 41 is adopted.

$$p(x) = \frac{1}{5}(-1 \quad 4 \quad 2)\begin{pmatrix} p(x-2) \\ p(x-1) \\ p(x+1) \end{pmatrix} \qquad (41)$$

9.2. Case 2: Exceptional Processing 1 for End Point

A case when p(x−1) is an end point of an image is considered.

As for pixels located at the left side of an end of an image, a pixel value is obtained in the power minimum norm by copying the pixel value with a mirror image.

9.2.1. Case 2-1

Figure 22A:
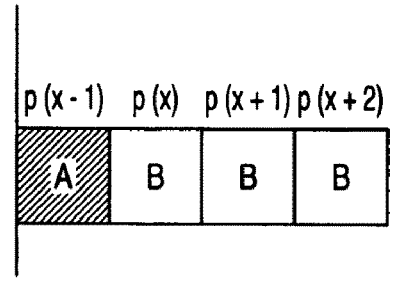
FIG. 22 is explanatory views illustrating examples of the pixel arrangement.

A case of the pixel arrangement shown in FIG. 22A is considered. The pixel arrangement copied by mirror image is shown in FIG. 22B.

Figure 22B:
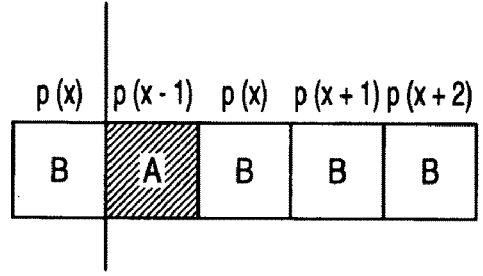

Referring to FIGS. 22A and 22B, the following Expression 42 is obtained.

$$H_0 = -\frac{1}{2}p(x) + p(x-1) - \frac{1}{2}p(x) \qquad (42)$$
$$H_1 = -\frac{1}{2}p(x-1) + p(x) - \frac{1}{2}p(x+1)$$
$$H_2 = -\frac{1}{2}p(x) + p(x+1) - \frac{1}{2}p(x+2)$$

In this case, 'E' can be expressed by the following Expression 43.

$$E = \sum_{j=0}^{2} H_j^2 \qquad (43)$$

Lx=p(x). Accordingly, a condition for minimizing 'E' is expressed by the following Expression 44.

$$p(x)=p(x\cdot 1) \qquad (44)$$

Figure 23A:
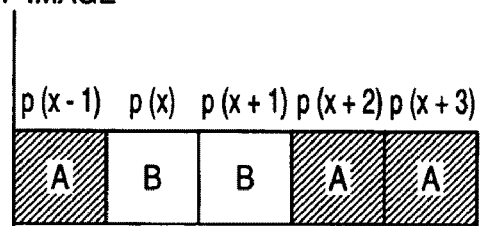
FIG. 23 is explanatory views illustrating examples of the pixel arrangement.

A case of the pixel arrangement shown in FIG. 23A is considered. The pixel arrangement copied by mirror image is shown in FIG. 23B.

Figure 23B:
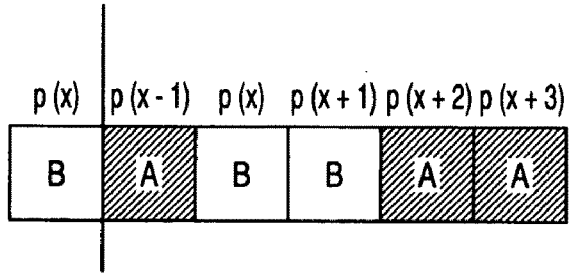

Referring to FIGS. 23A and 23B, the following Expression 45 is obtained.

$$H_0 = -\frac{1}{2}p(x) + p(x-1) - \frac{1}{2}p(x) \qquad (45)$$
$$H_1 = -\frac{1}{2}p(x-1) + p(x) - \frac{1}{2}p(x+1)$$
$$H_2 = -\frac{1}{2}p(x) + p(x+1) - \frac{1}{2}p(x+2)$$
$$H_3 = -\frac{1}{2}p(x+1) + p(x+2) - \frac{1}{2}p(x+3)$$

In this case, 'E' can be expressed by the following Expression 46.

$$E = \sum_{j=0}^{3} H_j^2 \qquad (46)$$

Accordingly, the condition for minimizing 'E' is expressed by the following Expression 47.

$$\begin{pmatrix} p(x) \\ p(x+1) \end{pmatrix} = \frac{1}{38}\begin{pmatrix} 32 & 10 & -4 \\ 15 & 32 & -9 \end{pmatrix}\begin{pmatrix} p(x-1) \\ p(x+2) \\ p(x+3) \end{pmatrix} \qquad (47)$$

Figure 24A:
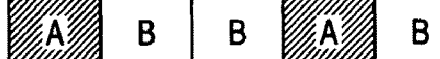
FIG. 24 is explanatory views illustrating examples of the pixel arrangement.
Figure 24B:
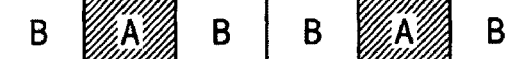

A case of the pixel arrangement shown in FIG. 24A is considered. The pixel arrangement copied by mirror image is shown in FIG. 24B.

Expression of 'E' is the same as described above. The condition for minimizing 'E' is expressed by the following Expression 48.

$$\begin{pmatrix} p(x) \\ p(x+1) \end{pmatrix} = \frac{1}{29}\begin{pmatrix} 26 & 3 \\ 15 & 14 \end{pmatrix}\begin{pmatrix} p(x-1) \\ p(x+2) \end{pmatrix} \qquad (48)$$

Figure 25A:
FIG. 25 is explanatory views illustrating examples of the pixel arrangement.

A case of the pixel arrangement shown in FIG. 25A is considered. The pixel arrangement copied by mirror image is shown in FIG. 25B.

Figure 25B:

Referring to FIGS. 25A and 25B, the following Expression 49 is obtained.

$$H_0 = -\frac{1}{2}p(x) + p(x-1) - \frac{1}{2}p(x) \qquad (49)$$
$$H_1 = -\frac{1}{2}p(x-1) + p(x) - \frac{1}{2}p(x+1)$$
$$H_2 = -\frac{1}{2}p(x) + p(x+1) - \frac{1}{2}p(x+2)$$

'E' can be expressed by the following Expression 50.

$$E = \sum_{j=0}^{2} H_j^2 \qquad (50)$$

p(x) that minimizes 'E' is obtained in the following Expression 51.

$$p(x) = \frac{1}{9}\begin{pmatrix} 6 & 4 & -1 \end{pmatrix}\begin{pmatrix} p(x-1) \\ p(x+1) \\ p(x+2) \end{pmatrix} \quad (51)$$

Figure 26A:
FIG. 26 is explanatory views illustrating examples of the pixel arrangement.

A case of the pixel arrangement shown in FIG. 26A is considered. The pixel arrangement copied by mirror image is shown in FIG. 26B.

Expression of 'E' is the same as Expression 50. p(x) that minimizes 'E' is expressed by the following Expression 52.

$$p(x) = \frac{1}{4}\begin{pmatrix} 3 & 1 \end{pmatrix}\begin{pmatrix} p(x-1) \\ p(x+1) \end{pmatrix} \quad (52)$$

9.3. Case 3: Exceptional Processing 2 for End Point

A case when p(x) is an end point of an image is considered.

9.3.1. Case 3-1

A case of the pixel arrangement shown in FIG. 27 is considered.

In this case, a pixel value cannot be specified. Ideally, the method described in '8.3 method 1' should be adopted. However, since the processing load is large if the method is adopted, it is herein assumed that p(x)=0

A case of the pixel arrangement shown in FIG. 28A is considered. The pixel arrangement copied by mirror image is shown in FIG. 28B.

Referring to FIGS. 28A and 28B, the following Expression 53 is obtained.

$$H_0 = -\frac{1}{2}p(x) + p(x+1) - \frac{1}{2}p(x+2) \quad (53)$$

$$H_1 = -\frac{1}{2}p(x+1) + p(x) - \frac{1}{2}p(x+1)$$

$$H_2 = -\frac{1}{2}p(x) + p(x+1) - \frac{1}{2}p(x+2)$$

$$H_3 = -\frac{1}{2}p(x+1) + p(x+2) - \frac{1}{2}p(x+3)$$

In this case, 'E' can be expressed by the following Expression 54.

$$E = \sum_{j=0}^{3} H_j^2 \quad (54)$$

The condition for minimizing 'E' is expressed by the following Expression 55.

$$\begin{pmatrix} p(x) \\ p(x+1) \end{pmatrix} = \frac{1}{7}\begin{pmatrix} 11 & -4 \\ 10 & -3 \end{pmatrix}\begin{pmatrix} p(x+2) \\ p(x+3) \end{pmatrix} \quad (55)$$

A case of the pixel arrangement shown in FIG. 29A is considered. The pixel arrangement copied by mirror image is shown in FIG. 29B.

Expression of 'E' is the same as described above. In this case, since a condition of E=0 exists, the following Expression 56 is obtained.

$$p(x)=p(x+1)=p(x+2) \quad (56)$$

Figure 30A:
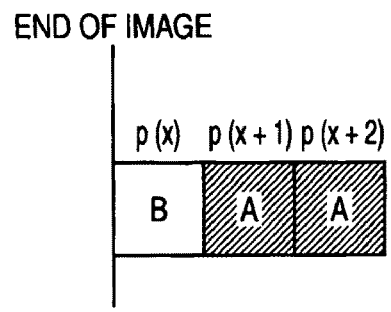
FIG. 30 is explanatory views illustrating examples of the pixel arrangement.

A case of the pixel arrangement shown in FIG. 30A is considered. The pixel arrangement copied by mirror image is shown in FIG. 30B.

Figure 30B:
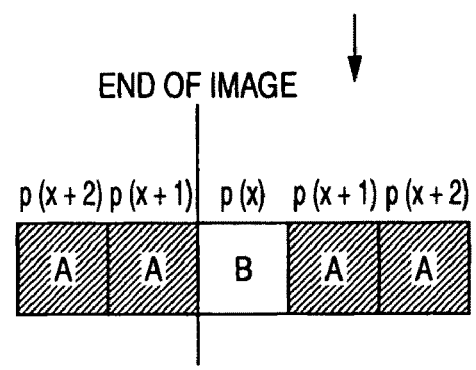

Referring to FIGS. 30A and 30B, the following Expression 57 is obtained.

$$H_0 = -\frac{1}{2}p(x+2) + p(x+1) - \frac{1}{2}p(x) \quad (57)$$

$$H_1 = -\frac{1}{2}p(x+1) + p(x) - \frac{1}{2}p(x+1)$$

$$H_2 = -\frac{1}{2}p(x) + p(x+1) - \frac{1}{2}p(x+2)$$

In this case, 'E' can be expressed in the following Expression 58.

$$E = \sum_{j=0}^{2} H_j^2 \quad (58)$$

p(x) that minimizes 'E' can be expressed by the following Expression 59.

$$p(x) = \frac{1}{3}\begin{pmatrix} 4 & -1 \end{pmatrix}\begin{pmatrix} p(x+1) \\ p(x+2) \end{pmatrix} \quad (59)$$

Figure 31A:
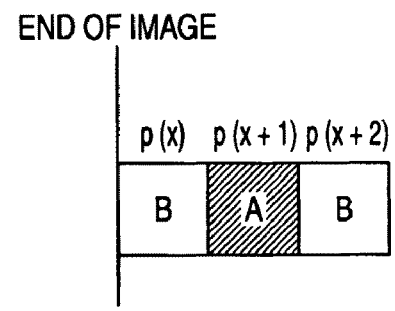
FIG. 31 is explanatory views illustrating examples of the pixel arrangement.
Figure 31B:
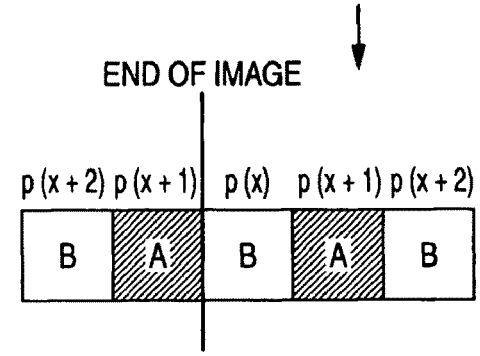

A case of the pixel arrangement shown in FIG. 31A is considered. The pixel arrangement copied by mirror image is shown in FIG. 31B.

Expression of 'E' is the same as described above. In this case, since a condition of E=0 exists, the following Expression 60 is obtained.

$$p(x)=p(x+1) \quad (60)$$

9.4. Case of Considering Sub-Sampling

Next, a case of considering a sub-sampling phase will be described.

9.4.1. Case 1-2-1

Figure 32:
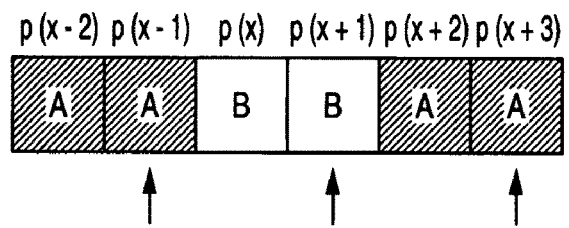
FIG. 32 is an explanatory view illustrating an example of the pixel arrangement.

A case of the pixel arrangement shown in FIG. 32 is considered. That is, the sub-sampling of phase is performed such that the arrow shown in FIG. 32 corresponds to the right end of the filter.

In the case when the right end of the filter is indicated by the arrow shown in FIG. 32, the following Expression 61 is obtained by using (p(x−1), p(x+1), p(x+3)) and $H_i$ in Expression 29.

$$E = H_1^2 + H_3^2 \quad (61)$$

By using Expression 61, the following Expression 62 is obtained.

$$\begin{pmatrix} p(x) \\ p(x+1) \end{pmatrix} = \frac{1}{2}\begin{pmatrix} 0 & 1 & 2 & -1 \\ 0 & 0 & 4 & -2 \end{pmatrix}\begin{pmatrix} p(x-2) \\ p(x-1) \\ p(x+2) \\ p(x+3) \end{pmatrix} \quad (62)$$

9.4.2. Case 1-2-2

Figure 33:
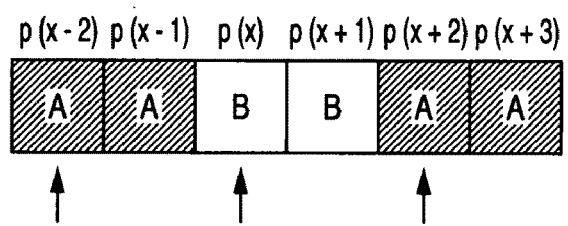
FIG. 33 is an explanatory view illustrating an example of the pixel arrangement.

A case of the pixel arrangement shown in FIG. 33 is considered.

In the case when the right end of the filter is indicated by the arrow shown in FIG. 33, the following Expression 63 is obtained by using (p(x−2), p(x), p(x+2)) and $H_i$ in Expression 29.

$$E = H_0^2 + H_2^2 \quad (63)$$

By using Expression 63, the following Expression 64 is obtained.

$$\begin{pmatrix} p(x) \\ p(x+1) \end{pmatrix} = \frac{1}{2}\begin{pmatrix} -2 & 4 & 0 & 0 \\ -1 & 2 & 1 & 0 \end{pmatrix}\begin{pmatrix} p(x-2) \\ p(x-1) \\ p(x+2) \\ p(x+3) \end{pmatrix} \quad (64)$$

9.4.3. Case 1-3-1

Figure 34:
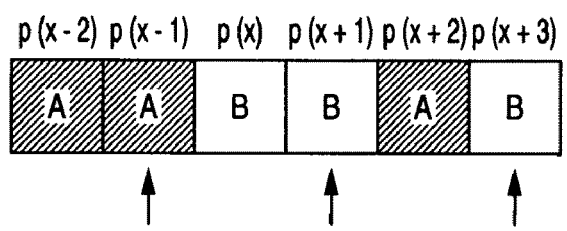
FIG. 34 is an explanatory view illustrating an example of the pixel arrangement.

A case of the pixel arrangement shown in FIG. 34 is considered. In the case when the right end of the filter is indicated by the arrow shown in FIG. 34, the following Expression 65 is obtained by using (p(x−1), p(x+1), p(x+3)) and $H_i$ in Expression 29.

$$E = H_1^2 + H_3^2 \quad (65)$$

In this case, the solution is indefinite. Accordingly, in this case, the following Expression 66 is obtained assuming that p(x+1)=p(x+2).

$$\begin{pmatrix} p(x) \\ p(x+1) \end{pmatrix} = \frac{1}{2}\begin{pmatrix} 0 & 1 & 1 \\ 0 & 0 & 2 \end{pmatrix}\begin{pmatrix} p(x-2) \\ p(x-1) \\ p(x+2) \end{pmatrix} \quad (66)$$

Furthermore, in the case of assuming that p(x)=p(x+1), the following Expression 67 is obtained.

$$\begin{pmatrix} p(x) \\ p(x+1) \end{pmatrix} = \begin{pmatrix} 0 & 1 & 0 \\ 0 & 1 & 0 \end{pmatrix}\begin{pmatrix} p(x-2) \\ p(x-1) \\ p(x+2) \end{pmatrix} \quad (67)$$

9.4.4. Case 1-3-2

Figure 35:
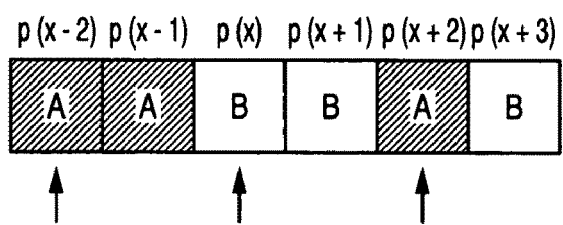
FIG. 35 is an explanatory view illustrating an example of the pixel arrangement.

A case of the pixel arrangement shown in FIG. 35 is considered.

In the case when the right end of the filter is indicated by the arrow shown in FIG. 35, the following Expression 68 is obtained by using (p(x−2), p(x), p(x+2)) and $H_i$ in Expression 29.

$$E = H_o^2 + H_2^2 \quad (68)$$

In this case, the following Expression 69 is obtained.

$$\begin{pmatrix} p(x) \\ p(x+1) \end{pmatrix} = \frac{1}{2}\begin{pmatrix} -2 & 4 & 0 \\ -1 & 2 & 1 \end{pmatrix}\begin{pmatrix} p(x-2) \\ p(x-1) \\ p(x+2) \end{pmatrix} \quad (69)$$

9.4.5. Case 1-4-1

Figure 36:
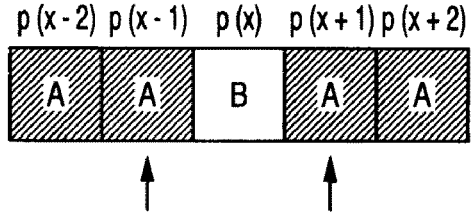
FIG. 36 is an explanatory view illustrating an example of the pixel arrangement.

A case of the pixel arrangement shown in FIG. 36 is considered.

In the case when the right end of the filter is indicated by the arrow shown in FIG. 36, the following Expression 70 is obtained by using (p(x−1), p(x+1)) and $H_i$ in Expression 36.

$$H_1 = -\frac{1}{2}p(x-1) + p(x) - \frac{1}{2}p(x+1) = 0 \quad (70)$$

Accordingly, p(x) is obtained by using the following Expression 71.

$$p(x) = \frac{1}{2}\begin{pmatrix} 0 & 1 & 1 & 0 \end{pmatrix}\begin{pmatrix} p(x-2) \\ p(x-1) \\ p(x+1) \\ p(x+2) \end{pmatrix} \quad (71)$$

9.4.6. Case 1-4-2

Figure 37:
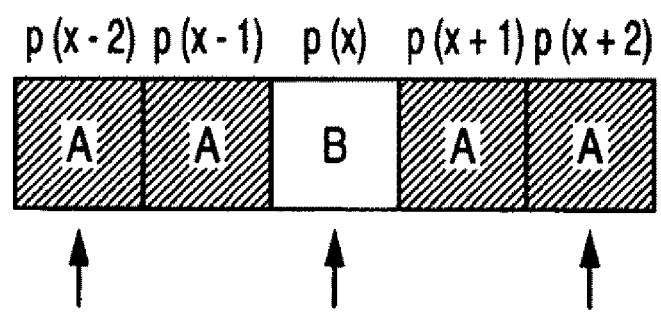
FIG. 37 is an explanatory view illustrating an example of the pixel arrangement.

A case of the pixel arrangement shown in FIG. 37 is considered.

In the case when the right end of the filter is indicated by the arrow shown in FIG. 37, the following Expression 72 is obtained by using (p(x−2), p(x), p(x+2)) and $H_i$ in Expression 36.

$$E = H_0^2 + H_2^2 \quad (72)$$

p(x) that minimizes 'E' is expressed in the following Expression 73.

$$p(x) = \frac{1}{2}\begin{pmatrix} -1 & 2 & 2 & -1 \end{pmatrix}\begin{pmatrix} p(x-2) \\ p(x-1) \\ p(x+1) \\ p(x+2) \end{pmatrix} \quad (73)$$

9.4.7. Case 1-5-1

Figure 38:
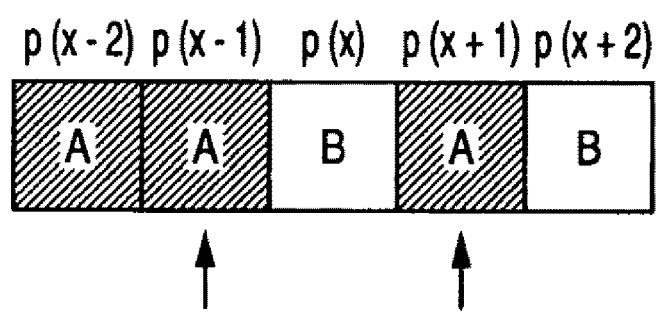
FIG. 38 is an explanatory view illustrating an example of the pixel arrangement.

A case of the pixel arrangement shown in FIG. 38 is considered.

In the case when the right end of the filter is indicated by the arrow shown in FIG. 38, the following Expression 72 is preferably obtained by using (p(x−1), p(x+1)) and $H_i$ in Expression 36. Accordingly, a result is the same as Expression 71.

$$H_1 = -\frac{1}{2}p(x-1) + p(x) - \frac{1}{2}p(x+1) = 0 \quad (74)$$

9.4.8. Case 1-5-2

Figure 39:
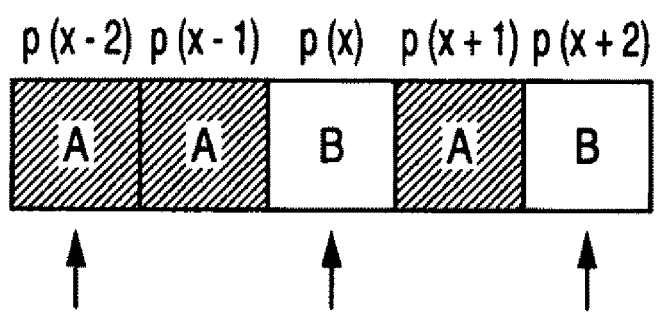
FIG. 39 is an explanatory view illustrating an example of the pixel arrangement.

A case of the pixel arrangement shown in FIG. 39 is considered.

In the case when the right end of the filter is indicated by the arrow shown in FIG. 39, the following Expression 75 is obtained by using (p(x−2), p(x), p(x+2)) and $H_i$ in Expression 36.

$$E=H_0^2+H_2^2 \qquad (75)$$

In this case, since solution that allows E=0 exists, the following Expression 76 is obtained.

$$p(x) = (-1 \quad 2)\begin{pmatrix} p(x-2) \\ p(x-1) \end{pmatrix} \qquad (76)$$

9.4.9. Case 2-2-1

Figure 40:
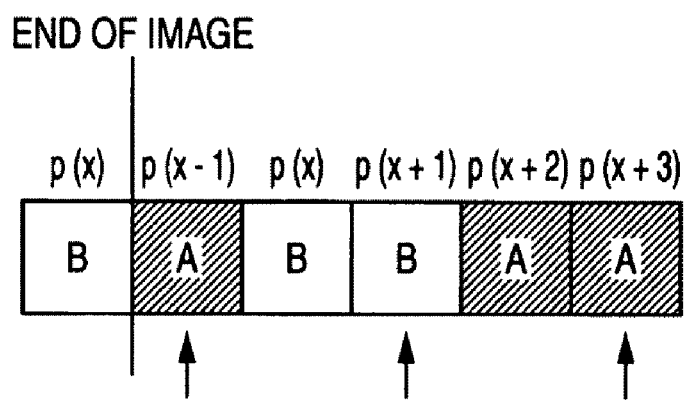
FIG. 40 is an explanatory view illustrating an example of the pixel arrangement.

A case of the pixel arrangement shown in FIG. 40 is considered.

In the case when the right end of the filter is indicated by the arrow shown in FIG. 40, the following Expression 77 is obtained by using (p(x−1),p(x+1), p(x+3)) and $H_i$ in Expression 45.

$$E=H_1^2+H_3^2 \qquad (77)$$

In this case, p(x) and p(x+1) are expressed in the following Expression 78.

$$\begin{pmatrix} p(x) \\ p(x+1) \end{pmatrix} = \frac{1}{2}\begin{pmatrix} 1 & 2 & -1 \\ 0 & 4 & -2 \end{pmatrix}\begin{pmatrix} p(x-1) \\ p(x+2) \\ p(x+3) \end{pmatrix} \qquad (78)$$

9.4.10. Case 2-2-2

Figure 41:
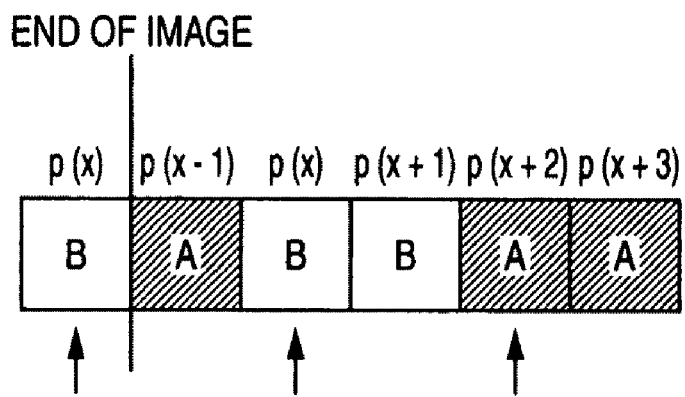
FIG. 41 is an explanatory view illustrating an example of the pixel arrangement.

A case of the pixel arrangement shown in FIG. 41 is considered.

In the case when the right end of the filter is indicated by the arrow shown in FIG. 41, the following Expression 79 is obtained by using (p (x), p(x), p(x+2)) and $H_i$ in Expression 45.

$$E=H_0^2+H_2^2 \qquad (79)$$

In this case, p(x) and p(x+1) are expressed in the following Expression 80.

$$\begin{pmatrix} p(x) \\ p(x+1) \end{pmatrix} = \frac{1}{2}\begin{pmatrix} 2 & 0 & 0 \\ 1 & 1 & 0 \end{pmatrix}\begin{pmatrix} p(x-1) \\ p(x+2) \\ p(x+3) \end{pmatrix} \qquad (80)$$

9.4.11. Case 2-3-1

Figure 42:
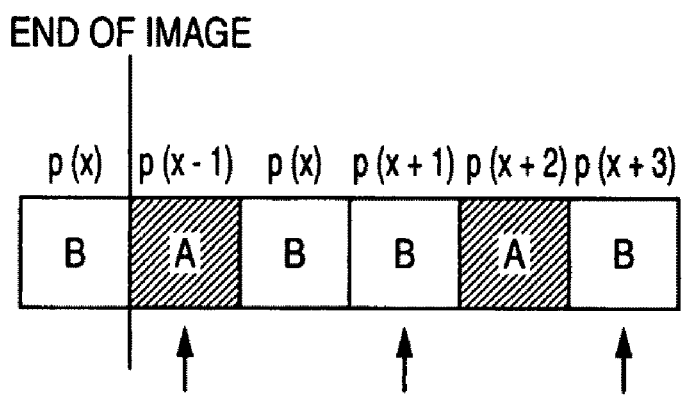
FIG. 42 is an explanatory view illustrating an example of the pixel arrangement.

A case of the pixel arrangement shown in FIG. 42 is considered.

The solution is the same as '9.4.3. Case 1-3-1'.

9.4.12. Case 2-3-2

Figure 43:
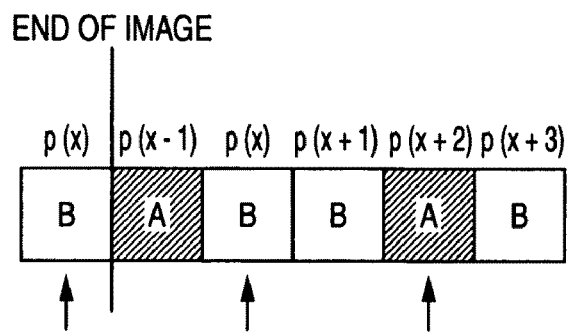
FIG. 43 is an explanatory view illustrating an example of the pixel arrangement.

A case of the pixel arrangement shown in FIG. 43 is considered.

In the case when the right end of the filter is indicated by the arrow shown in FIG. 43, the following Expression 81 is obtained by using (p (x), p(x), p(x+2)) and $H_i$ in Expression 45.

$$E=H_0^2+H_2^2 \qquad (81)$$

In this case, since solution that allows E=0 exists, the following Expression 82 is obtained.

$$\begin{pmatrix} p(x) \\ p(x+1) \end{pmatrix} = \frac{1}{2}\begin{pmatrix} 2 & 0 \\ 1 & 1 \end{pmatrix}\begin{pmatrix} p(x-1) \\ p(x+2) \end{pmatrix} \qquad (82)$$

9.4.13. Case 2-4-1

Figure 44:
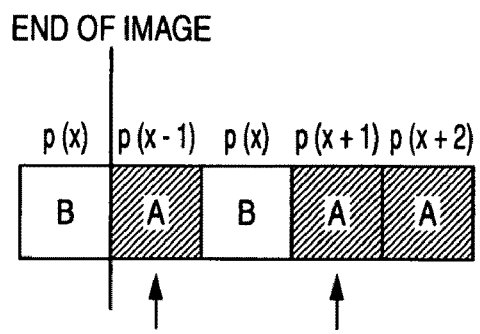
FIG. 44 is an explanatory view illustrating an example of the pixel arrangement.

A case of the pixel arrangement shown in FIG. 44 is considered.

The solution is the same as '9.4.5. Case 1-4-1'.

9.4.14. Case 2-4-2

Figure 45:
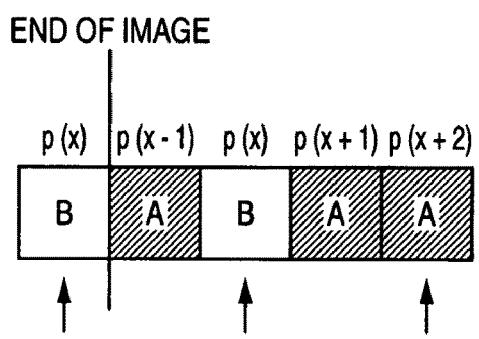
FIG. 45 is an explanatory view illustrating an example of the pixel arrangement.

A case of the pixel arrangement shown in FIG. 45 is considered.

In the case when the right end of the filter is indicated by the arrow shown in FIG. 45, the following Expression 83 is obtained by using (p(x), p(x), p(x+2)) and $H_i$ in Expression 49.

$$E=H_0^2+H_2^2 \qquad (83)$$

In this case, p(x) that minimizes 'E' is expressed in the following Expression 84.

$$p(x) = \frac{1}{5}(4 \quad 2 \quad -1)\begin{pmatrix} p(x-1) \\ p(x+1) \\ p(x+2) \end{pmatrix} \qquad (84)$$

9.4.15. Case 2-5-1

Figure 46:
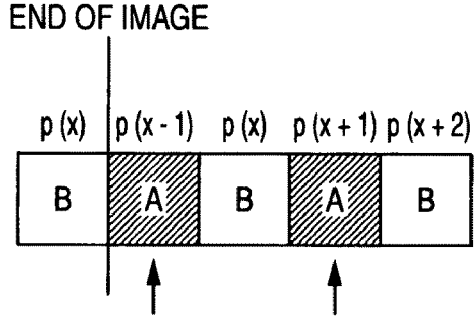
FIG. 46 is an explanatory view illustrating an example of the pixel arrangement.

A case of the pixel arrangement shown in FIG. 46 is considered.

The solution is the same as '9.4.5. Case 1-4-1'.

9.4.16. Case 2-5-2

Figure 47:
FIG. 47 is an explanatory view illustrating an example of the pixel arrangement.

A case of the pixel arrangement shown in FIG. 47 is considered.

In the case when the right end of the filter is indicated by the arrow shown in FIG. 47, the following Expression 85 is obtained by using (p (x), p(x), p(x+2)) and $H_i$ in Expression 49.

$$E=H_0^2+H_2^2 \qquad (85)$$

In this case, p(x) that minimizes 'E' is expressed in the following Expression 86.

$$p(x)=p(x-1) \qquad (86)$$

9.4.17. Case 3-2-1

Figure 48:
FIG. 48 is an explanatory view illustrating an example of the pixel arrangement.

A case of the pixel arrangement shown in FIG. 48 is considered.

In the case when the right end of the filter is indicated by the arrow shown in FIG. 48, the following Expression 87 is obtained by using (p(x+1), p(x+1), p(x+3)) and $H_i$ in Expression 49.

$$E=H_1^2+H_3^2 \qquad (87)$$

In this case, since solution that allows E=0 exists, the following Expression 88 is obtained.

$$\begin{pmatrix} p(x) \\ p(x+1) \end{pmatrix} = \begin{pmatrix} 2 & -1 \\ 2 & -1 \end{pmatrix}\begin{pmatrix} p(x+2) \\ p(x+3) \end{pmatrix} \qquad (88)$$

9.4.18. Case 3-2-2

Figure 49:
FIG. 49 is an explanatory view illustrating an example of the pixel arrangement.

A case of the pixel arrangement shown in FIG. 49 is considered.

In the case when the right end of the filter is indicated by the arrow shown in FIG. 49, the following Expression 89 is obtained by using (p(x+2), p(x), p(x+2)) and $H_i$ in Expression 49.

$$E = H_0^2 + H_2^2 \quad (89)$$

In this case, the solution is indefinite. The solution that allows E=0 when p(x)=p(x+1) is assumed is adopted. That is, the following Expression 90 is obtained.

$$\begin{pmatrix} p(x) \\ p(x+1) \end{pmatrix} = \begin{pmatrix} 1 & 0 \\ 1 & 0 \end{pmatrix} \begin{pmatrix} p(x+2) \\ p(x+3) \end{pmatrix} \quad (90)$$

9.4.19. Case 3-3-1

Figure 50:
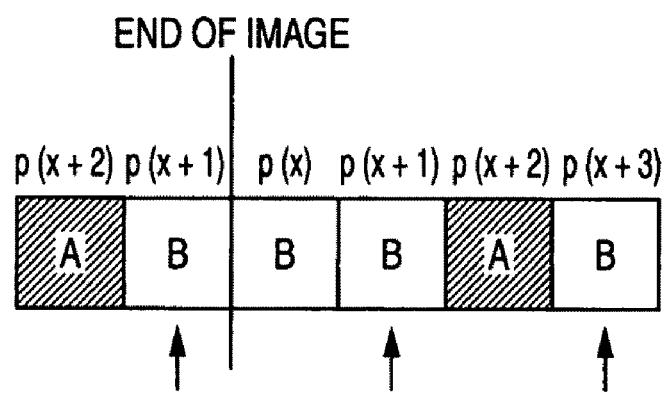
FIG. 50 is an explanatory view illustrating an example of the pixel arrangement.

A case of the pixel arrangement shown in FIG. 50 is considered.

In the case when the right end of the filter is indicated by the arrow shown in FIG. 50, the following Expression 91 is obtained by using (p(x+2), p(x+1), p(x+3)) and $H_i$ in Expression 49.

$$E = H_1^2 + H_3^2 \quad (91)$$

In this case, the solution is indefinite. The solution that allows E=0 when p(x)=p(x+3) is assumed is adopted. That is, the following Expression 92 is obtained.

$$\begin{pmatrix} p(x) \\ p(x+1) \end{pmatrix} = \begin{pmatrix} 1 \\ 1 \end{pmatrix} (p(x+2)) \quad (92)$$

9.4.20. Case 3-3-2

Figure 51:
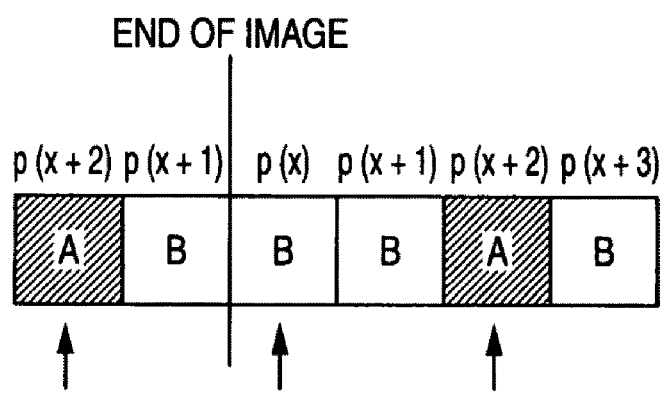
FIG. 51 is an explanatory view illustrating an example of the pixel arrangement.

A case of the pixel arrangement shown in FIG. 51 is considered.

The solution is the same as '9.4.18 Case 3-2-2'.

9.4.21. Case 3-4-1

Figure 52:
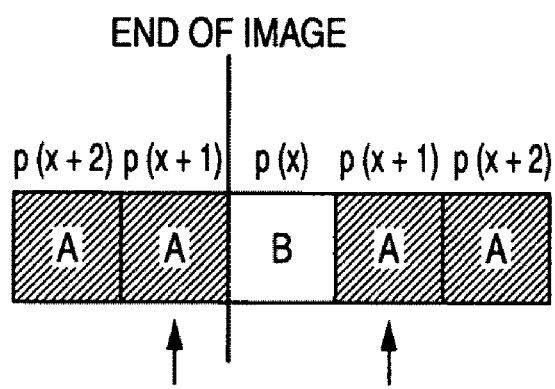
FIG. 52 is an explanatory view illustrating an example of the pixel arrangement.

A case of the pixel arrangement shown in FIG. 52 is considered.

In this case, preferably, the following Expression 93 is obtained.

$$p(x) = p(x+1) \quad (93)$$

9.4.22. Case 3-4-2

Figure 53:
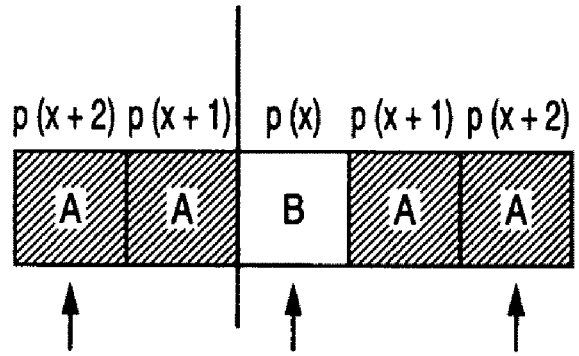
FIG. 53 is an explanatory view illustrating an example of the pixel arrangement.

A case of the pixel arrangement shown in FIG. 53 is considered.

In this case, preferably, the following Expression 94 is obtained.

$$p(x) = 2p(x+1) - p(x+2) \quad (94)$$

9.4.23. Case 3-5-1

Figure 54:
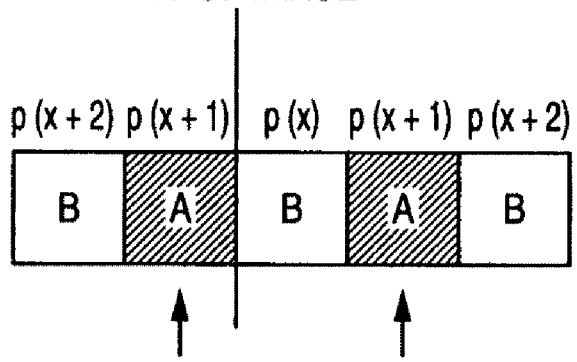
FIG. 54 is an explanatory view illustrating an example of the pixel arrangement.

A case of the pixel arrangement shown in FIG. 54 is considered.

In this case, preferably, the following Expression 95 is obtained.

$$p(x) = p(x+1) \quad (95)$$

9.4.24. Case 3-5-2

Figure 55:
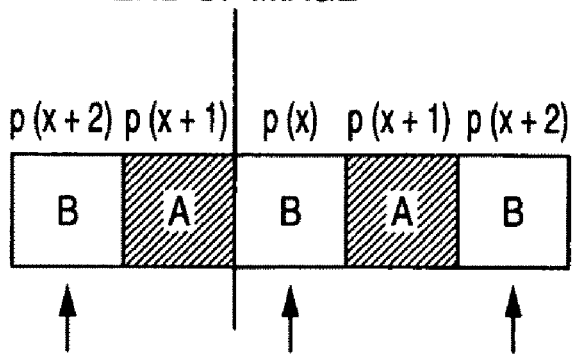
FIG. 55 is an explanatory view illustrating an example of the pixel arrangement.

A case of the pixel arrangement shown in FIG. 55 is considered.

In this case, since the solution is indefinite, p(x)=p(x+2). Accordingly, preferably, the following Expression 96 is obtained.

$$p(x) = p(x+1) \quad (96)$$

10. Test for Effect Confirmation

A test for confirming the effect of the compensation method was performed.

10.1. Details of Test

As pseudo text, a vertically striped pattern was considered. The following text pattern is considered.

That is, two 'A' pixels consecutively exist and N 'B' pixels consecutively exist. This is repeated.

1 to 5 was used as the above value N.

The above-described image (N=1 to 5) is compensated by using the above cases 1-1, 1-2, and 1-4. A method of switching the cases is performed by using the 'hybrid method described in 6.8'.

Here, all filter coefficients are limited to positive values by using the method described in '7. Limitation of filter coefficient'.

Comparative methods are as follows.

First comparative example: compensation is performed by using an 'A' pixel value closest in the horizontal direction.

Second comparative example: compensation is performed by using a mean value of an 'A' pixel value closest to the left and an 'A' pixel value closest to the right.

Third comparative example: in addition to the second comparative example, a low pass filter is further provided. The filter kernel is assumed to be (¼, 2/4, and ¼).

In this exemplary embodiment, the first comparative example, the second comparative example, and the third comparative example, the following lossless coding test and lossy coding test are performed.

(1) Lossless Coding Test

An amount of lossless codes is examined.

(2) Lossy Coding Test

The relationship between an amount of codes and PSNR (peak signal-to-noise ratio) [dB] is examined. Here, PSNR is calculated for only an effective pixel region ('A' pixel region).

PSNR is represented as a difference between PSNRs when an compensated image is an original image. That is, PSNR when compressing an image compensated in the method x is assumed to be PSNRx. In addition, PSNR when compressing an original image is assumed to be PSNRorg. PSNR shown in the following is PSNRx−PSNRorg [dB].

JPEG2000 is used as a compression method.

10.2. Test Result 10.2.1 Lossless Coding Test

Figure 56:
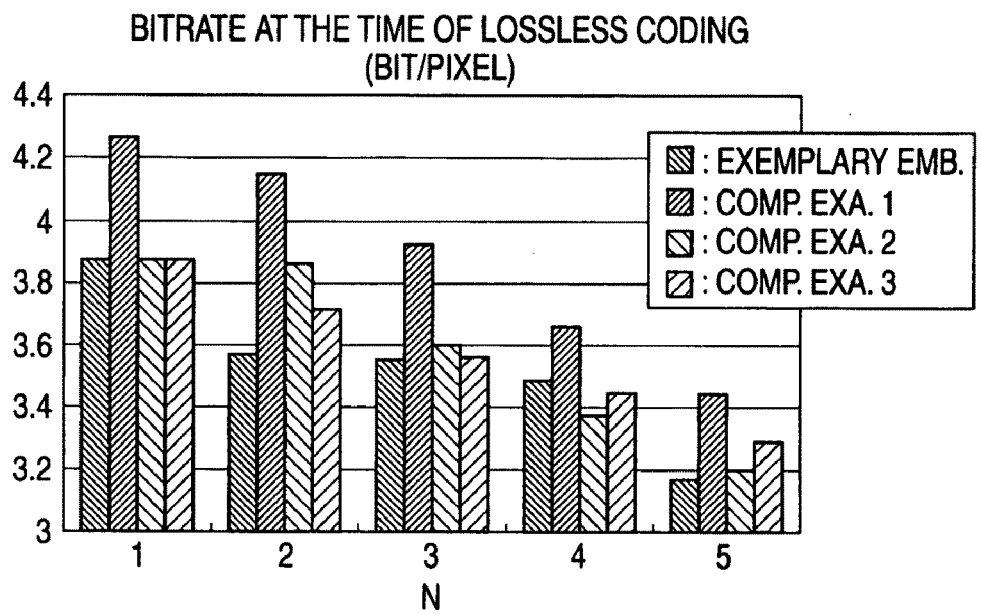
FIG. 56 is a graph illustrating a test result.

A bit rate (Bit rate [bit/pixel]) when performing lossless coding is shown in FIG. 56.

As shown in FIG. 56, the bit rate in this exemplary embodiment is stable and small (smallest except for the case of N=4). That is, it is shown in FIG. 56 that a high compression effect can be obtained.

10.2.2. Lossy Coding Test

Figure 57:
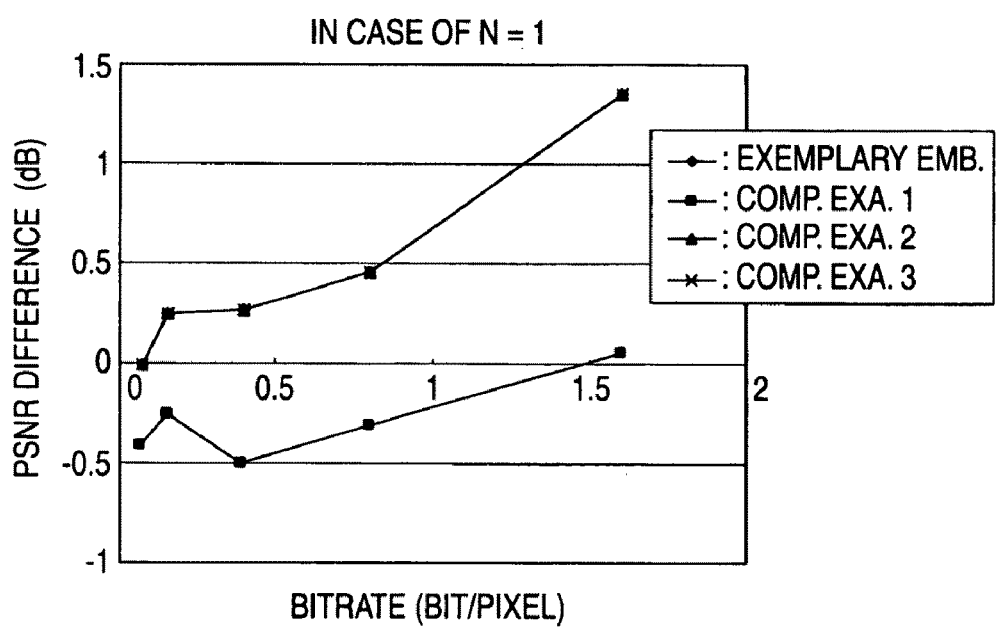
FIG. 57 is a graph illustrating a test result.
Figure 58:
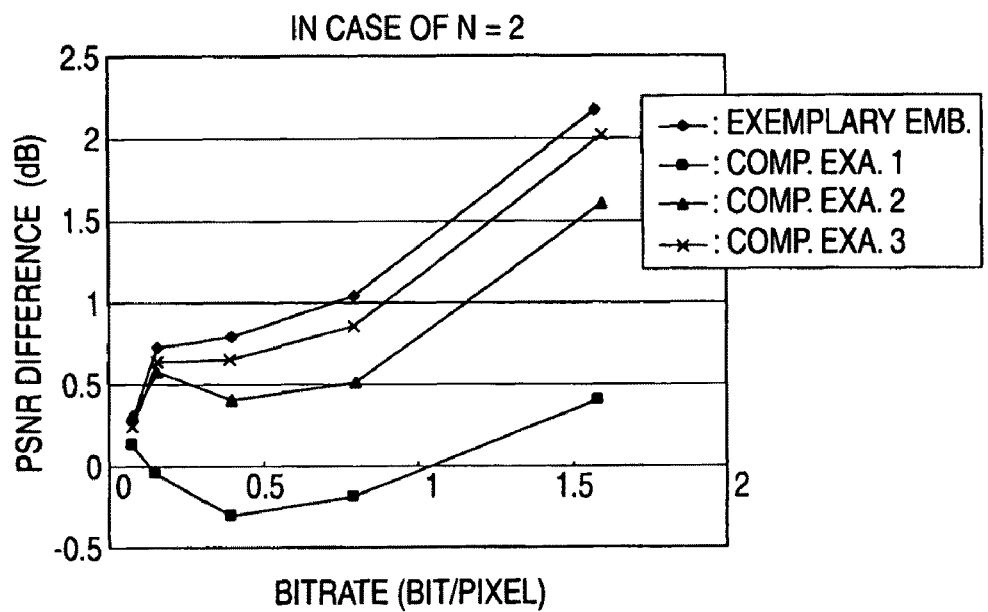
FIG. 58 is a graph illustrating a test result.
Figure 59:
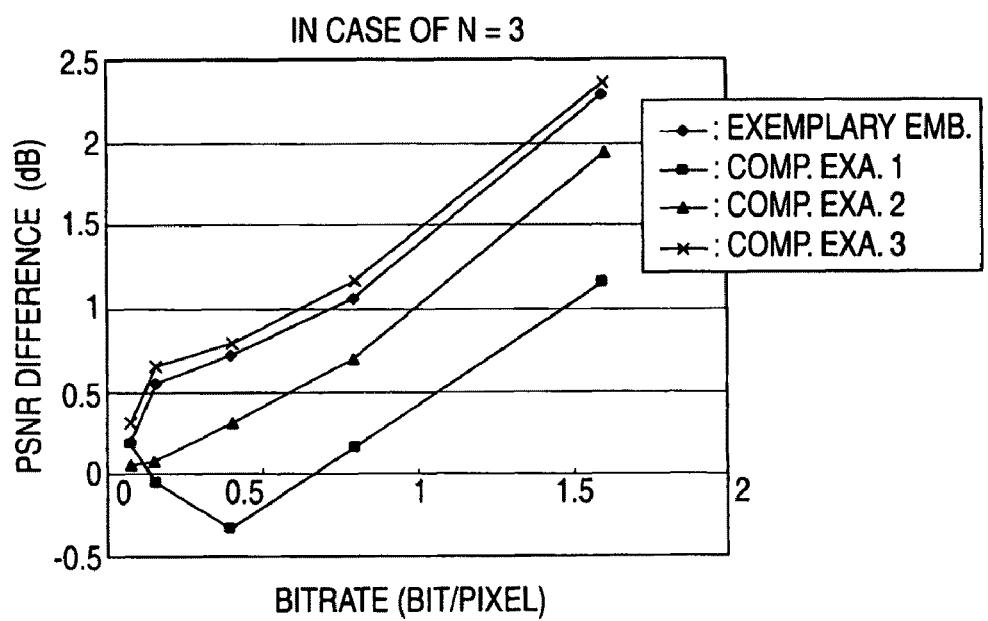
FIG. 59 is a graph illustrating a test result.
Figure 60:
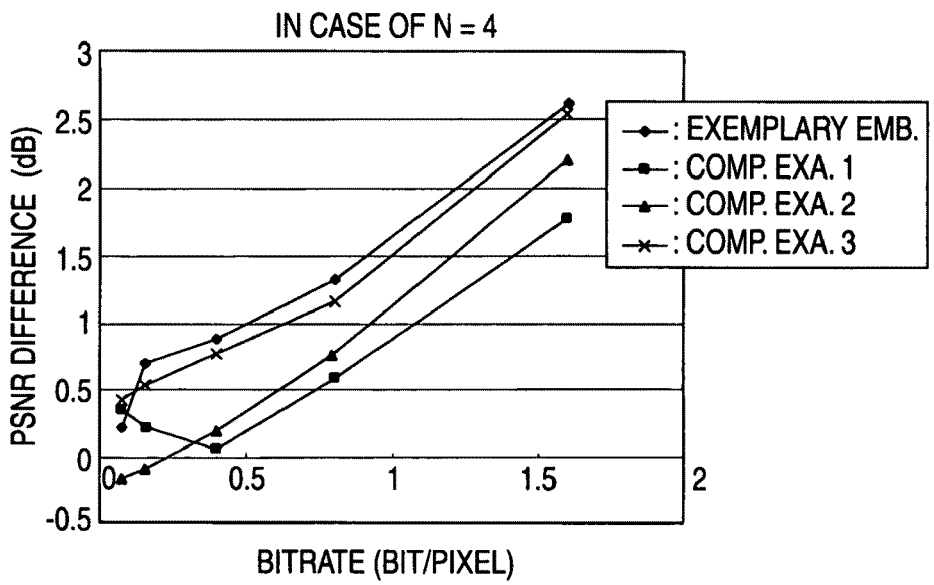
FIG. 60 is a graph illustrating a test result.
Figure 61:
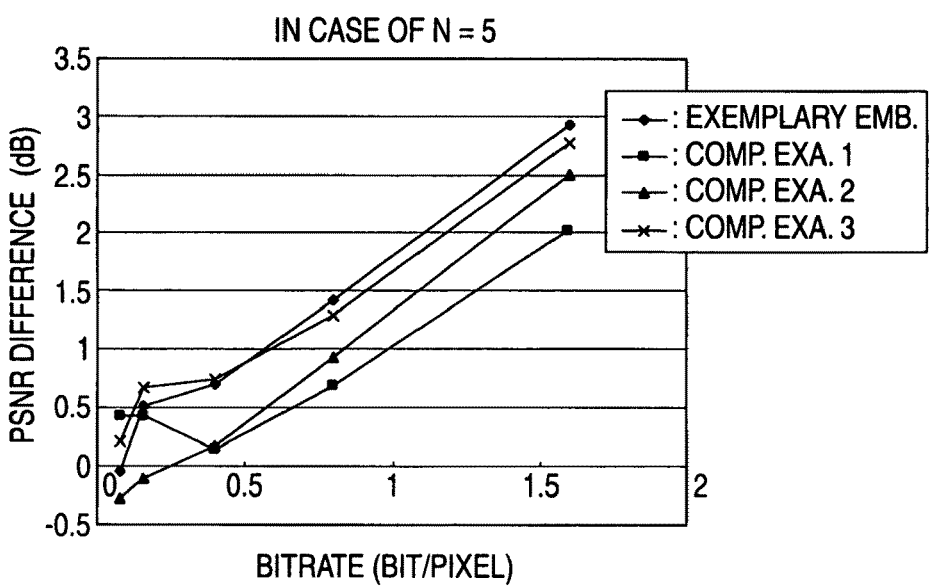
FIG. 61 is a graph illustrating a test result.

Results of lossy coding tests are shown in FIGS. 57 to 61. FIG. 57 shows a case of N=1, FIG. 58 shows a case of N=2, FIG. 59 shows a case of N=3, FIG. 60 shows a case of N=4, and FIG. 61 shows a case of N=5. In addition, as a result of having used the method described in '7. limitation of filter coefficient', processes in this exemplary embodiment, the second comparative example, and the third comparative example are equal in the case of N=1 shown in FIG. 57.

It can be seen that the compression performance in this exemplary embodiment is stable and satisfactory. As compared with the third comparative example, a case in which the compression performance in this exemplary embodiment is worse is only N=3. Furthermore, even in the case N=3, a difference between the compression performance in this exemplary embodiment and that in the third comparative example is small.

Furthermore, it is noticeable that one-path sequential processing is enough in this exemplary embodiment. In the first to third comparative examples, it is not possible to calculate compensated pixel values when position and value of a right 'A' pixel are not known. That is, in the known examples, there is no choice but to perform two-path processing. In contrast, in this exemplary embodiment, when the right 'A' pixel is positioned farther, it is possible to calculate the compensated pixel value even if the position or value of the right 'A' pixel is not known. Accordingly, this exemplary embodiment is advantageous in terms of processing time or amount of memory consumption, since one-path processing is possible.

Figure 62:
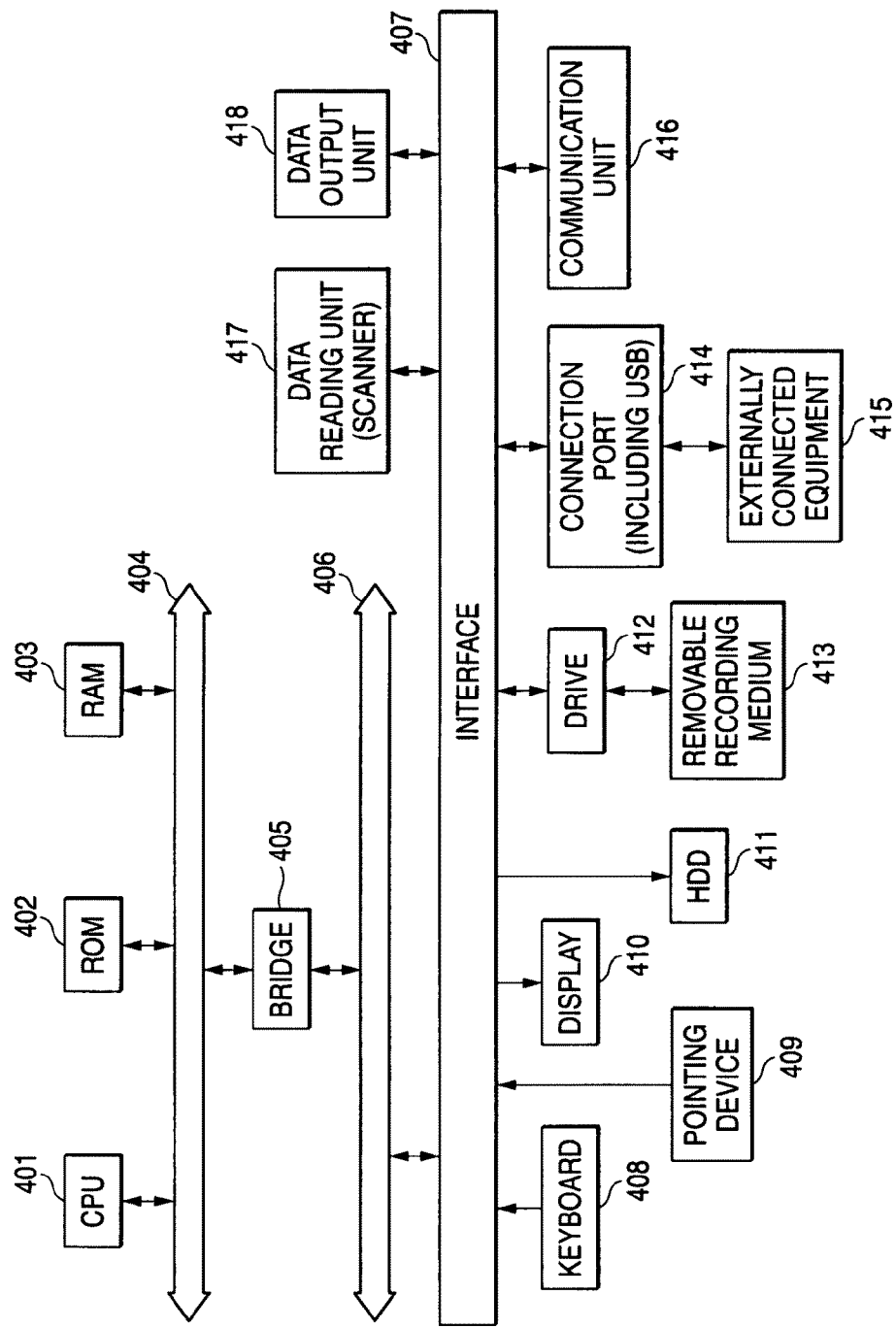
FIG. 62 is a block diagram illustrating an example of the hardware configuration of a computer for realizing the exemplary embodiment.
Figure 63:
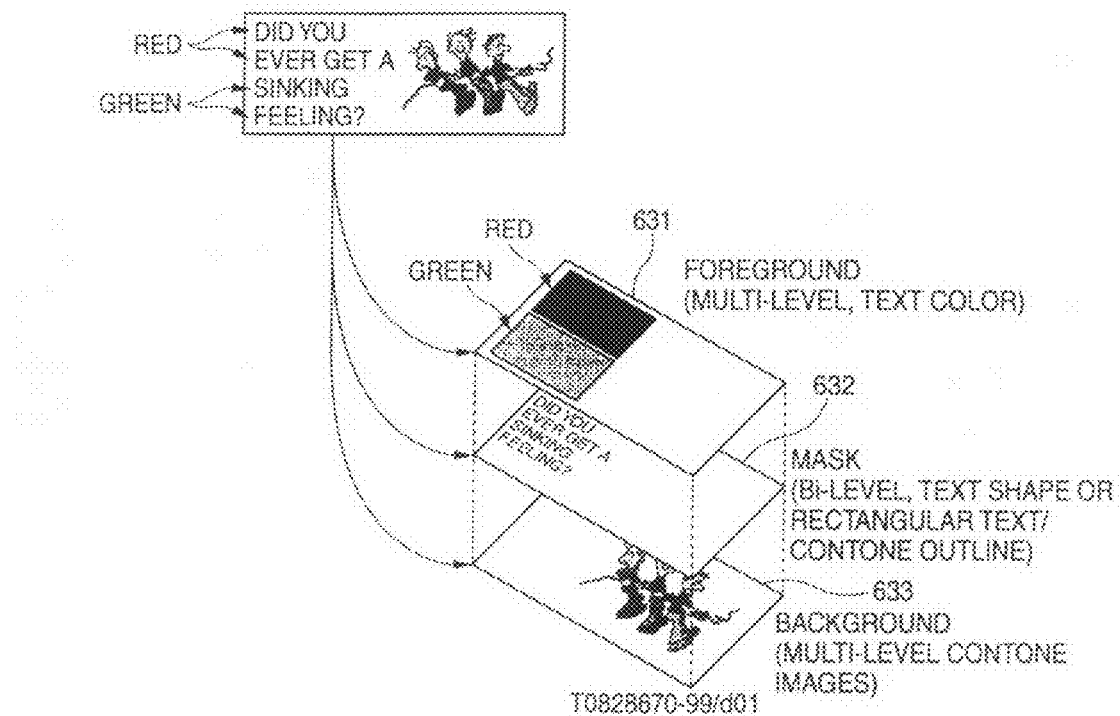
FIG. 63 is an explanatory view illustrating a related art.

Hereinafter, an example of the hardware configuration of an image processing system according to this exemplary embodiment will be described with reference to FIG. 62. The configuration shown in FIG. 62 is an image processing system including, for example, a personal computer (PC). FIG. 62 illustrates an example of the hardware configuration including a data reading unit 417, such as a scanner, and a data output unit 418, such as a printer.

The CPU (central processing unit) 401 is a control unit that executes processing according to a computer program that describes sequences, which are executed by various modules described in this exemplary embodiment, that is, the region division module 13, the second pixel identification module 14, and the pixel value change module 15, the compression module 16, and the image editing module 18.

A ROM (read only memory) 402 stores programs or operation parameters used by the CPU 401. A RAM (random access memory) 403 stores programs used in execution of the CPU 401 or parameters that properly vary in the execution. Those described above are connected to each other by a host bus 404, such as a CPU bus.

The host bus 404 is connected to an external bus 406, such as a PCI (peripheral component interconnect/interface) through a bridge 405.

A keyboard 408 and a pointing device 409, such as a mouse, are input devices operated by an operator. A display 410 includes a liquid crystal display device or a CRT (cathode ray tube) and displays various kinds of information as text or image information.

A HDD (hard disk drive) 411 has a hard disk therein and serves to drive a hard disk and records or reproduces information or programs executed by the CPU 401. The hard disk stores input image or compressed images. In addition, various kinds of computer programs, such as various data processing programs, are stored in the hard disk.

A drive 412 serves to read out data or programs recorded in a magnetic disk, an optical disk, and a magneto-optic disk, which are installed, or a removable recording medium 413, such as a semiconductor memory, and to supply the data or programs to the RAM 403 connected through an interface 407, the external bus 406, the bridge 405, and the host bus 404. The removable recording medium 413 may be used as a data recording region in the same manner as a hard disk.

A connection port 414 serves as a port for connection with externally connected equipment 415 and has connection parts, such as USB and IEEE1394. The connection port 414 is connected to the CPU 401 through the interface 407, the external bus 406, the bridge 405, and the host bus 404. A communication unit 416 is connected to a network and executes data communication processing with external apparatuses. The data reading unit 417 is, for example, a scanner and executes a process of reading a document. The data output unit 418 is, for example, a printer and executes a process of outputting document data.

The hardware configuration shown in FIG. 62 is only an example. In addition, this exemplary embodiment is not limited to the configuration shown in FIG. 62. That is, any kind of configuration in which the modules described in this exemplary embodiment are executable may be used. For example, some modules may be implemented by using dedicated hardware (for example, ASIC). Alternatively, some modules may be provided in an external system so as to be connected through a communication line. Alternatively, A plurality of systems shown in FIG. 62 may be connected to each other through a communication line so as to cooperatively operate. In addition, some modules may be provided within a copying machine, a facsimile, a scanner, or a multi-function machine (also called a multi-function copier and having functions of scanner, printer, copier, facsimile, and the like). In addition, the program in this exemplary embodiment may be realized as a software product.

Further, it is possible to find the following exemplary embodiments from the above description.

[A] An image processing system includes an identification unit, a region division unit and a pixel value change unit. The identification unit identifies a second pixel among an image including a first pixel and the second pixel. A pixel value of the first pixel is not to be changed. A pixel value of the second pixel is to be changed. The region division unit divides the image into regions. The pixel value change unit changes the value of the second pixel to a predetermined value through a filtering process when the second pixel identified by the identification unit is included within the regions obtained by the region division unit. If a negative value is included in a filter coefficient and the pixel value change unit is to change the pixel value, the filter coefficient is changed in a direction in which the filter coefficient becomes zero and the filter coefficients are normalized so that a sum of the filter coefficients becomes 1.

[B] An image processing system includes an identification unit, a region division unit and a pixel value change unit. The identification unit identifies a second pixel among an image including a first pixel and the second pixel. A pixel value of the first pixel is not to be changed. A pixel value of the second pixel is to be changed. The region division unit divides the image into regions. The pixel value change unit changes the value of the second pixel to a predetermined value through a filtering process when the second pixel identified by the identification unit is included within the regions obtained by the region division unit. An order in which the pixel value change unit changes pixel values is set from a plurality of different directions within the image and the value of the second pixel is changed to a mean value thereof.

[C] An image processing system includes an identification unit, a region division unit and a pixel value change unit. The identification unit identifies a second pixel among an image including a first pixel and the second pixel. A pixel value of the first pixel is not to be changed. A pixel value of the second pixel is to be changed. The region division unit divides the image into regions. The pixel value change unit changes the value of the second pixel to a predetermined value through a filtering process when the second pixel identified by the identification unit is included within the regions obtained by the region division unit. The regions obtained by division of the region division unit are rectangular. The filtering process is discrete cosine transform.

[D] In the image processing system of [C], a pixel value of an image located at an invalid position is determined so that a zero run length within an image part after the discrete cosine transform becomes large.

[E] In the image processing system of [C], a pixel value of an image located at an invalid position is determined so that norm of an image part after the discrete cosine transform becomes small.
[F] In the image processing system of [C], the discrete cosine transform is performed for a two-dimensional object.
[G] In the image processing system of [C], the discrete cosine transform is performed for a one-dimensional object.
[H] In the image processing system of [C], the discrete cosine transform is performed under a size (8×8) used in JPEG.
[I] In the image processing system of [C], quantization is performed after the discrete cosine transform.
[J] An image processing system includes an identification unit, a region division unit and a pixel value change unit. The identification unit identifies a second pixel among an image including a first pixel and the second pixel. A pixel value of the first pixel is not to be changed. A pixel value of the second pixel is to be changed. The region division unit divides the image into regions. The pixel value change unit changes a value of the second pixel in a direction in which the value after a filtering process becomes zero when the second pixel identified by the identification unit is included within the regions obtained by the region division unit. Each of the regions obtained by the region division unit is a line including only one second pixel. A length of each region is a size of a high pass filter in JPEG2000.
[K] An image processing system includes an identification unit, a region division unit and a pixel value change unit. The identification unit identifies a second pixel among an image including a first pixel and the second pixel. A pixel value of the first pixel is not to be changed. A pixel value of the second pixel is to be changed. The region division unit divides the image into regions. The pixel value change unit changes a value of the second pixel in a direction in which a value of power after a filtering process becomes minimum when the second pixel identified by the identification unit is included within the regions obtained by the region division unit. The regions obtained by the region division unit are lines having predetermined length.
[L] An image processing system includes an identification unit, a region division unit, a first pixel value change unit and a second pixel value change unit. The identification unit identifies a second pixel among an image including a first pixel and the second pixel. A pixel value of the first pixel is not to be changed. A pixel value of the second pixel is to be changed. The region division unit divides the image into regions. The first pixel value change unit changes a value of the second pixel in a direction in which the value after a filtering process becomes zero when the second pixel identified by the identification unit is included within the regions obtained by the region division unit. The second pixel value change unit changes a value of the second pixel in a direction in which a value of power after the filtering process becomes minimum when predetermined number or more of consecutive second pixels identified by the identification unit are included within the regions obtained by the region division unit. When the predetermined number or more of consecutive second pixels exist, processing by the second pixel value change unit is performed. In other cases, processing by the first pixel value change unit is performed.
[M] In the image processing system of [J], [k], or [L], filter coefficients are limited to positive values.
[N] In the image processing system of [J], [k], or [L], the processing order of the pixel value change unit is a plurality of raster scans.

Thus, it is possible to cope with a case in which compensating cannot be performed by one raster scan.

[O] In the image processing system of [J], [k], or [L], the processing order of the pixel value change unit is a plurality of raster scans and a mean value thereof is an output value.
[P] The image processing system described in [J], [k], or [L], where the regions obtained by the region division unit are two-dimensional regions and the high pass filter is a two-dimensional filter.

In addition, the program described above may be stored in a recording medium or provided by a communication unit. In this case, for example, the program described above may be understood as the invention of a 'recording medium that is readable by a computer recorded with a program'.

The 'recording medium that is readable by a computer recorded with a program' refers to a recording medium, which is readable by a computer recorded with a program, used for installation, execution, and distribution of programs.

For example, the recording medium includes, as a digital versatile disk (DVD), 'DVD-R, DVD-RW, and DVD-RAM' that are specifications decided by DVD forum and 'DVD+R and DVD+RW' that are specifications decided by DVD+RW. In addition, the recording medium includes, as a compact disc (CD), a read only memory (CD-ROM), a CD recordable (CD-R), and a CD rewritable (CD-RW). In addition, the recording medium includes a magneto-optic disk (MO), a flexible disk (FD), a magnetic tape, a hard disk, a read only memory (ROM), an electrically erasable programmable read only memory (EEPROM), a flash memory, and a random access memory (RAM).

Furthermore, the program or a part of the program may be recorded in the recording medium so as to be stored or distributed. Furthermore, the program may be transmitted through communication. For example, a local area network (LAN), metropolitan area network (MAN), a wide area network (WAN), a wireline network used for Internet, Intranet, or Extranet, or a wireless communication network may be used to transmit the program. Furthermore, a transmission medium using a combination thereof may be used to transmit the program, or the program may be transmitted through carrier waves.

In addition, the program may be a part of another program or may be recorded in a recording medium together with a separate program.

What is claimed is:

1. An image processing system comprising:
   an identification unit that identifies at least one second pixel among an image including a first pixel and the at least one second pixel, a pixel value of the first pixel being not to be changed and a pixel value of the at least one second pixel being to be changed;
   a region division unit that divides the image into a plurality of frequency regions and a plurality of frequency sub-regions within the plurality of frequency regions using a processor;
   a pixel value change unit that changes the value of the at least one second pixel to a value through a filtering process when the at least one second pixel identified by the identification unit is included within the plurality of frequency regions or the plurality of frequency sub-regions obtained by the region division unit, wherein the pixel value change unit is configured to switch between an output value zero norm and a local power minimum norm based on whether the first pixel is included in the plurality of frequency regions or the plurality of frequency sub-regions.

2. The system according to claim 1, wherein if a negative value is included in filter coefficients used when the pixel value change unit changes the pixel value of the at least one second pixel, the negative filter coefficients are changed to become zero and subsequently all of the filter coefficients are normalized such that a sum of the filter coefficients is 1.

3. The system according to claim 1, wherein when filter coefficients are used when the pixel value change unit changes the pixel value of the at least one second pixel, the filter coefficients are changed to become values equal to or larger than zero.

4. The system according to claim 1, wherein an order in which the pixel value change unit changes pixel values is set from a plurality of different numerical directions within the image.

5. The system according to claim 1, further comprising:
an image input unit that inputs the image including the first pixel and the at least one second pixel, the pixel value of the first pixel being not to be changed and the pixel value of the at least one second pixel being to be changed; and
an image compression unit that compresses an image including a pixel changed by the pixel value change unit.

6. The system according to claim 1, further comprising:
an image input unit that inputs the image including the first pixel and the at least one second pixel, the pixel value of the first pixel being not to be changed and the pixel value of the at least one second pixel being to be changed;
an output unit that outputs an image including a pixel changed by the pixel value change unit; and
an image editing unit that edits the image including the pixel changed by the pixel value change unit.

7. An image processing system comprising:
an identification unit that identifies at least one second pixel among an image including a first pixel and the at least one second pixel, a pixel value of the first pixel being not to be changed and a pixel value of the at least one second pixel being to be changed;
a region division unit that divides the image into a plurality of frequency regions and a plurality of frequency sub-regions within the plurality of frequency regions using a processor; and
a first pixel value change unit that changes a value of the at least one second pixel in a numerical direction in which the value after a filtering process becomes zero when the at least one second pixel identified by the identification unit is included within the plurality of frequency regions or the plurality of frequency sub-regions obtained by the region division unit, wherein the pixel value change unit is configured to switch between an output value zero norm and a local power minimum norm based on whether the first pixel is included in the plurality of frequency regions or the plurality of frequency sub-regions.

8. The system according to claim 7, further comprising:
a second pixel value change unit that changes a value of the at least one second pixel in a numerical direction in which a value of power after the filtering process becomes minimum, the second pixel value change unit changes the value of the at least one second pixel when a predetermined number of second pixels consecutively identified by the identification unit are included within the plurality of frequency regions obtained by the region division unit.

9. The system according to claim 8, wherein the first pixel value change unit sequentially changes pixel values.

10. The system according to claim 8, wherein if a negative value is included in filter coefficients used when the first pixel value change unit or the second pixel value change unit changes the pixel value of the at least one second pixel, the negative filter coefficients are changed to become zero and subsequently all of the filter coefficients are normalized such that a sum of the filter coefficients is 1.

11. The system according to claim 8, wherein when filter coefficients are used when the first pixel value change unit or the second pixel value change unit changes the pixel value of the at least one second pixel, the filter coefficients are changed to become values equal to or larger than zero.

12. The system according to claim 8, wherein an order in which the first pixel value change unit or the second pixel value change unit changes pixel values is set from a plurality of different numerical directions within the image.

13. The system according to claim 8, further comprising:
an image input unit that inputs the image including the first pixel and the at least one second pixel, the pixel value of the first pixel being not to be changed and the pixel value of the at least one second pixel being to be changed; and
an image compression unit that compresses an image including a pixel changed by the first pixel value change unit or the second pixel value change unit.

14. The system according to claim 8, further comprising:
an image input unit that inputs the image including the first pixel and the at least one second pixel, the pixel value of the first pixel being not to be changed and the pixel value of the at least one second pixel being to be changed;
an output unit that outputs an image including a pixel changed by the first pixel value change unit or the second pixel value change unit; and
an image editing unit that edits the image including the pixel changed by the first pixel value change unit or the second pixel value change unit.

15. The system according to claim 7, wherein the first pixel value change unit sequentially changes pixel values.

16. The system according to claim 7, further comprising:
an image input unit that inputs the image including the first pixel and the at least one second pixel, the pixel value of the first pixel being not to be changed and the pixel value of the at least one second pixel being to be changed; and
an image compression unit that compresses an image including a pixel changed by the first pixel value change unit.

17. The system according to claim 7, further comprising:
an image input unit that inputs the image including the first pixel and the at least one second pixel, the pixel value of the first pixel being not to be changed and the pixel value of the at least one second pixel being to be changed;
an output unit that outputs an image including a pixel changed by the first pixel value change unit; and
an image editing unit that edits the image including the pixel changed by the first pixel value change unit.

18. An image processing system comprising:
an identification unit that identifies a second pixel among an image including a first pixel and the second pixel, a pixel value of the first pixel being not to be changed and a pixel value of the second pixel being to be changed;
a region division unit that divides the image into a plurality of frequency regions and a plurality of frequency sub-regions within the plurality of frequency regions using a processor; and
a pixel value change unit that changes a value of the second pixel in a numerical direction in which a value of power after a filtering process becomes minimum when the second pixel identified by the identification unit is included within the plurality of frequency regions or the plurality of frequency sub-regions obtained by the region division unit, wherein the pixel value change unit is configured to switch between an output value zero norm and a local power minimum norm based on whether the first pixel is included in the plurality of frequency regions or the plurality of frequency sub-regions.

19. The system according to claim 18, further comprising:
an image input unit that inputs the image including the first pixel and the second pixel, the pixel value of the first pixel being not to be changed and the pixel value of the second pixel being to be changed; and
an image compression unit that compresses an image including a pixel changed by the pixel value change unit.

20. The system according to claim 18, further comprising:
an image input unit that inputs the image including the first pixel and the second pixel, the pixel value of the first pixel being not to be changed and the pixel value of the second pixel being to be changed;
an output unit that outputs an image including a pixel changed by the pixel value change unit; and
an image editing unit that edits the image including the pixel changed by the pixel value change unit.

21. A non-transitory computer readable medium storing a program causing a computer to execute image processing, the image processing comprising:
identifying a second pixel among an image including a first pixel and the second pixel, a pixel value of the first pixel being not to be changed and a pixel value of the second pixel being to be changed;
dividing the image into a plurality of frequency regions and a plurality of frequency sub-regions within the plurality of frequency regions using a processor; and
changing the value of the second pixel to a value through a filtering process when the identified second pixel is included within the plurality of frequency regions or the plurality of frequency sub-regions obtained by the dividing, wherein the filtering process is configured to switch between an output value zero norm and a local power minimum norm based on whether the first pixel is included in the plurality of frequency regions or the plurality of frequency sub-regions.

22. A non-transitory computer readable medium storing a program causing a computer to execute image processing, the image processing comprising:
identifying at least one second pixel among an image including a first pixel and the at least one second pixel, a pixel value of the first pixel being not to be changed and a pixel value of the at least one second pixel being to be changed;
dividing the image into a plurality of frequency regions and a plurality of frequency sub-regions within the plurality of frequency regions;
changing a value of the at least one second pixel in a numerical direction in which the value after a filtering process becomes zero when the identified at least one second pixel is included within the plurality of frequency regions or the plurality of frequency sub-regions obtained by the dividing, wherein the filtering process is configured to switch between an output value zero norm and a local power minimum norm based on whether the first pixel is included in the plurality of frequency regions or the plurality of frequency sub-regions.

23. The non-transitory computer readable medium according to claim 22, wherein the image processing further comprises:
changing a value of the at least one second pixel in a numerical direction in which a value of power after the filtering process becomes minimum when a predetermined number of second pixels consecutively identified are included within the plurality of frequency regions obtained by the dividing.

24. A non-transitory computer readable medium storing a program causing a computer to execute image processing, the image processing comprising:
identifying a second pixel among an image including a first pixel and the second pixel, a pixel value of the first pixel being not to be changed and a pixel value of the second pixel being to be changed;
dividing the image into a plurality of frequency regions and a plurality of frequency sub-regions within the plurality of frequency regions; and
changing a value of the second pixel in a numerical direction in which a value of power after a filtering process becomes minimum when the identified second pixel is included within the plurality of frequency regions or the plurality of frequency sub-regions obtained by the dividing, wherein the filtering process is configured to switch between an output value zero norm and a local power minimum norm based on whether the first pixel is included in the plurality of frequency regions or the plurality of frequency sub-regions.

* * * * *